US009672631B2

(12) United States Patent
Higgins et al.

(10) Patent No.: US 9,672,631 B2
(45) Date of Patent: Jun. 6, 2017

(54) MEDICAL IMAGE REPORTING SYSTEM AND METHOD

(75) Inventors: William E. Higgins, State College, PA (US); Jason D. Gibbs, State College, PA (US); Kun-Chang Yu, State College, PA (US); Michael W. Graham, State College, PA (US); Kongkuo Lu, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1240 days.

(21) Appl. No.: 12/866,758

(22) PCT Filed: Feb. 16, 2009

(86) PCT No.: PCT/US2009/034197
§ 371 (c)(1),
(2), (4) Date: Aug. 9, 2010

(87) PCT Pub. No.: WO2009/103046
PCT Pub. Date: Aug. 20, 2009

(65) Prior Publication Data
US 2010/0310146 A1      Dec. 9, 2010

Related U.S. Application Data

(60) Provisional application No. 61/028,562, filed on Feb. 14, 2008, provisional application No. 61/028,607, (Continued)

(51) Int. Cl.
*G06K 9/00*      (2006.01)
*G06T 7/162*     (2017.01)
*G06T 7/12*      (2017.01)

(52) U.S. Cl.
CPC .............. *G06T 7/162* (2017.01); *G06T 7/12* (2017.01); *G06T 2207/20044* (2013.01); *G06T 2207/30061* (2013.01)

(58) Field of Classification Search
USPC .................................................. 382/128, 131
See application file for complete search history.

(56) References Cited

U.S. PATENT DOCUMENTS

2001/0044576 A1    11/2001  Vining
2005/0107679 A1*   5/2005   Geiger ............... G06T 19/003
                                              600/407
(Continued)

FOREIGN PATENT DOCUMENTS

WO     WO-2001/078010     10/2001

OTHER PUBLICATIONS

Grady, Leo; Schwartz, Eric L. SIAM Journal on Scientific Computing. 2006, vol. 27 Issue 6, p. 1844-1866. 23p.*

(Continued)

*Primary Examiner* — Michael Tomaszewski
(74) *Attorney, Agent, or Firm* — Dinsmore & Shohl LLP

(57) ABSTRACT

This invention relates generally to medical imaging and, in particular, to a method and system for reconstructing a model path through a branched tubular organ. Novel methodologies and systems segment and define accurate endoluminal surfaces in airway trees, including small peripheral bronchi. An automatic algorithm is described that searches the entire lung volume for airway branches and poses airway-tree segmentation as a global graph-theoretic optimization problem. A suite of interactive segmentation tools for cleaning and extending critical areas of the automatically segmented result is disclosed. A model path is reconstructed through the airway tree.

31 Claims, 11 Drawing Sheets

Related U.S. Application Data filed on Feb. 14, 2008, provisional application No. 61/117,334, filed on Nov. 24, 2008.

(56) References Cited

U.S. PATENT DOCUMENTS

| | | | |
|---|---|---|---|
| 2006/0149134 A1 | 7/2006 | Soper et al. | |
| 2006/0171586 A1* | 8/2006 | Georgescu | G06K 9/6255 382/173 |
| 2007/0092864 A1 | 4/2007 | Reinhardt et al. | |
| 2009/0005693 A1* | 1/2009 | Brauner et al. | 600/481 |
| 2010/0278412 A1* | 11/2010 | Song et al. | 382/131 |

OTHER PUBLICATIONS

Pisupati, C. et al., Segmentation of 3D pulmonary trees using mathematical morphology, *Mathematical Morphology and Its Applications to Image and Signal Processing*, pp. 409-416, May 1996.
Preteux, F. et al., Modeling, segmentation and caliber estimation of bronchi in high-resolution computerized tomography, *Journal of Electronic Imaging*, 8(1): 36-45, Jan. 1999.
Kiraly, A., Virtual bronchoscopy for quantitative airway analysis, *in SPIE Medical Imaging 2005: Physiology, Function, and Structure from Medical Images*, 5746: 369-383, Apr. 2005.
Tschirren, J. et al., Intrathoracic airway trees: segmentation and airway morphology analysis from low-dose CT scans, *IEEE Transactions on Medical Imaging*, 24(12): 1529-1539, Dec. 2005.
Lorensen, W. et al., Marching cubes: A high resolution 3D surface construction algorithm, *Computer Graphics*, 21 (4): 163-169, Jul. 1987.
Helferty, J. et al., System for live virtual- endoscopic guidance of bronchoscopy, *IEEE Conf Computer Vision and Pattern Recognition*, 3: 68-75, Jun. 20-26, 2005.
Li, K. et al., Optimal surface segmentation in volumetric images—a graph-theoretic approach, *IEEE Trans. Pan. Anal. Machine Intell.*, 28(1): 119-134, Jan. 2006.
Saragaglia, A. et al., Automated volumetric approach for quantifying bronchial wall remodeling in MDCT, *SPIE Conf. on Mathematics of Data/Image Pattern Recognition, Compression, and Encryption with Applications IX*, 6315(1 ): 63150M, 2006.
Helferty, J. et al., Computer-based system for the virtual-endoscopic guidance of bronchoscopy, *Computer Vision and Image Understanding*, 108: 171-187, Oct.-Nov. 2007.
Gibbs, J. et al., Integrated system for planning peripheral bronchoscopic procedures, *SPIE Medical Imaging 2008: Visualization, Image-Guided Procedures and Modeling*, 6918: 2008.
Higgins, W. et al., 3D CT-video fusion for image-guided bronchoscopy, *Computerized Medical Imaging and Graphics*, 32: 159-73, 2008.
Mori, K. et al., Automated anatomical labeling of the bronchial branch and its application to the virtual bronchoscopy system, *IEEE Trans. Medical Imaging*, 19(2): 103-14, Feb. 2000.
Tschirren, J. et al., Matching and anatomical labeling of human airway tree, *IEEE Trans. Medical Imaging*, 24(12): 1540-1547, Dec. 2005.
Mori, K. et al., Automated nomenclature of bronchial branches extracted from CT images and its application to biopsy path planning in virtual bronchoscopy, *Medical Image Computing and Computer-Assisted Intervention*, 3750: 854-861 , 2005.
Graham, M. et al., Globally optimal model-based matching of anatomical trees, *SPIE Medical Imaging 2006: Image Processing*, 6144: 373-388, Mar. 2006.
Graham, M. et al., Optimal graph-theoretic approach to 3D anatomical tree matching, *IEEE Int. Symp. on Biomedical Imaging*, pp. 109-1 12, 2006.
Kukuk, M., An "optimal" k-needle placement strategy and its application to guiding transbronchial needle aspirations., *Computer Aided Surgery*, 9(6): 261-290, 2004.
Gibbs, J. et al., 3D path planning and extension for endoscopic guidance, *SPIE Medical Imaging 2007: Visualization and Image-Guided Procedures*, 6509: 6509 I K-I-6509 I K-13, 2007.

Dalrymple, N. et al., Introduction to the language of three-dimensional imaging with multidetector CT, *Radiographics*, 25: 1409-1428, Sep.-Oct. 2005.
Hopper, K. et al., Mucosal detail at CT virtual reality: surface versus volume rendering, *Radiology*, 214: 517-522, Feb. 2000.
Summers, R. et al., Virtual bronchoscopy: segmentation method for real-time display, *Radiology*, 200, Sep. 1996.
Mori, K. et al., Recognition of bronchus in three dimensional X-Ray CT images with application to virtualized bronchoscopy system, *Proc. 13th Int. Conf. Pattern Recognition III*, pp. 528-532, Aug. 1996.
Kiraly, A. et al., 3D human airway segmentation methods for virtual bronchoscopy, *Academic Radiology*, 9: 153-1 168, Oct. 2002.
Fetita, C. et al., Pulmonary airways: 3-D reconstruction from multislice CT and clinical investigation, *IEEE Transactions on Medical Imaging*, 23: 1353-1364, Nov. 2004.
Schlathoelter, T. et al., Simultaneous segmentation and tree reconstruction of the airways for virtual bronchoscopy, *SPIE Medical Imaging*,4684: 103-113, 2002.
Mayer, D. et al., Hybrid segmentation and virtual bronchoscopy based on CT images, *Academic Radiology*, 11:551-565, May 2004.
Asano, F. et al., Ultrathin bronchoscopic barium marking with virtual bronchoscopic navigation for fluoroscopy-assisted thoracoscopic surgery, *Chest*, 126(5): 1687-1693, Nov. 2004.
Asano, F. et al., A virtual bronchoscopic navigation system for pulmonary peripheral lesions, *Chest*, 130(2): 559-66, Aug. 2006.
Shinagawa, N. et al., Virtual bronchoscopic navigation system shortens the examination time-feasibility study of virtual bronchoscopic navigation system, *Lung Cancer*, 56: 201-206, 2007.
Graham, M. et al., Image-guided bronchoscopy for peripheral nodule biopsy: A human feasibility study, *Proceedings of the American Thoracic Society*, May 2008.
Falcao, A. et al., User-steered image segmentation paradigms: Live wire and live lane, *Graphical Models and Image Processing*, 60: 233-260, Jul. 1998.
Mortensen, E. et al., Interactive segmentation with intelligent scissors, *Graphical Models and Image Processing*, 60(5): 349-384, 1998.
Lu, K. et al., Interactive segmentation based on the live wire for 3D CT chest image analysis, *International Journal of Computer Assisted Radiology and Surgery*, 2: 151-167, Dec. 2007.
Saragaglia, A. et al., Airway wall thickness assessment: a new functionality in virtual bronchoscopy investigation, *SPIE Medical Imaging 2007: Physiology, Function, and Structure from Medical Images*, 6511(1): 651 10P-1-651 10P-12, 2007.
Graham, M., Robust Graph-Theoretic Methods for Matching and Labeling Anatomical Trees. PhD thesis, The Pennsylvania State University, 2008.
Johnson, D. et al., On knapsacks, partitions, and a new dynamic programming technique for trees, *Mathematics of Operations Research*, 8(1): 1-14, Feb. 1983.
Adler, I. et al., A geometric view of parametric linear programming, *Algorithmica*, 8: 161-176, Jan. 1992.
Helferty, J. et al., Technique for registering 3D virtual CT images to endoscopic video, *IEEE Int. Conf. Image Processing, II*, pp. 893-896, Oct. 7-10, 2001.
Yu, K. et al., Interactive graphical report enables off-line 3D endobronchial route planning prior to bronchoscopy, *Proceedings of the American Thoracic Society*, May 2008.
Graham, M. et al., Robust system for human airway tree segmentation, *SPIE Medical Imaging*, 6914, 2008.
Aykac, D. et al., Segmentation and analysis of the human airway tree from 3D X-ray CT images, *IEEE Transactions on Medical Imaging*, 22(8): 940-50, Aug. 2003.
Li, H. et al., Vessels as 4-D Curves: Global Minimal 4-D Paths to Extract 3-D Tubular Surfaces and Centerlines, *IEEE Transactions on Medical Imaging*, IEEEE Service Center, 26(9): 1213-23, Sep. 1, 2007.
Behrens, T. et al., Robust segmentation of tubular structures in 3-D medical images by parametric object detection and tracking, *IEEE Transactions on Systems, Man and Cybernetics, Part B: Cybernetics*, IEEE Service Center, 33(4): 554-61, Aug. 1, 2003.

\* cited by examiner

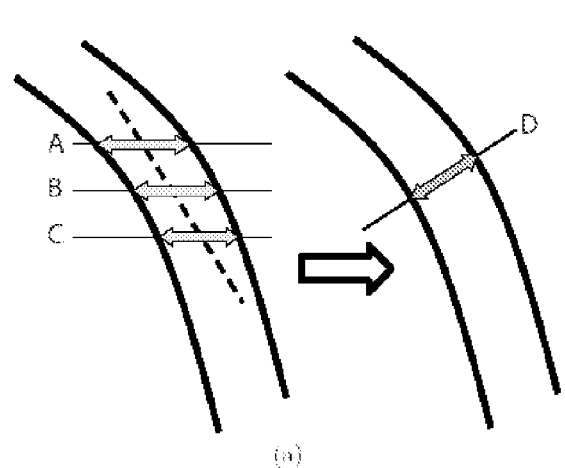
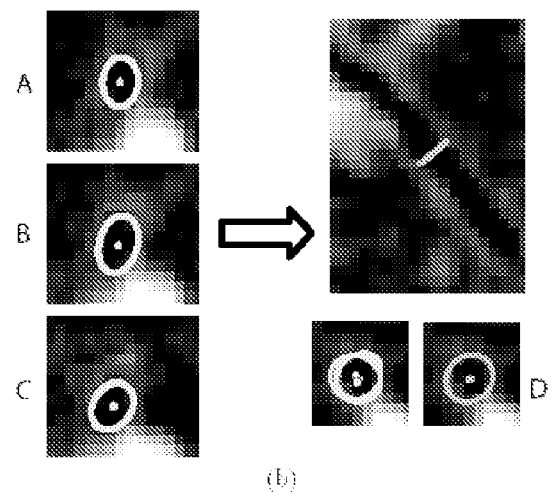
FIG. 2(a)  FIG. 2(b)
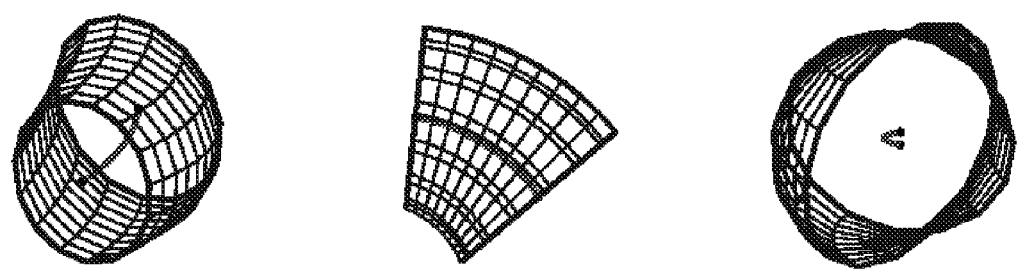
FIG. 3

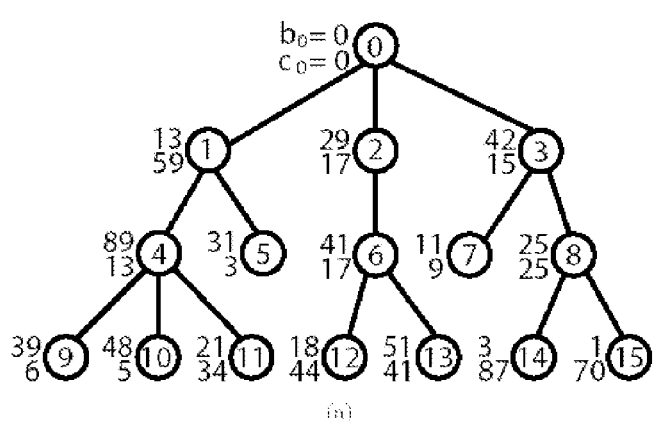 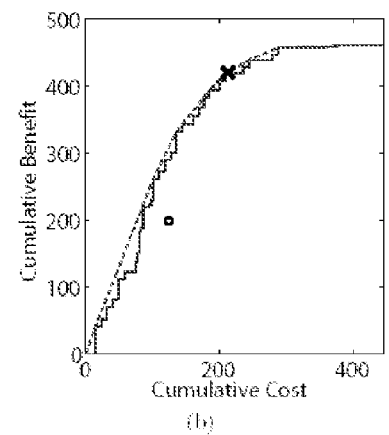
FIG. 4(a)          FIG. 4(b)
FIG. 6

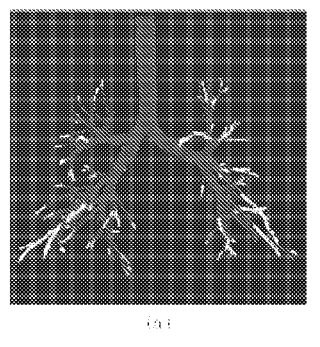 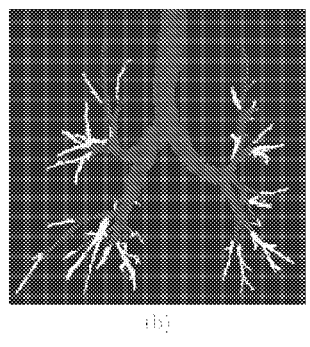 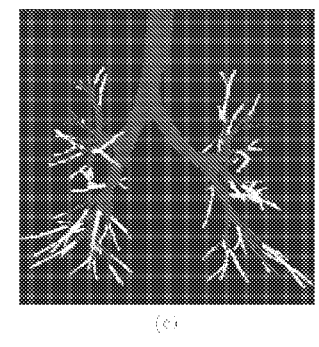
FIG. 9(a)　　　　FIG. 9(b)　　　　FIG. 9(c)
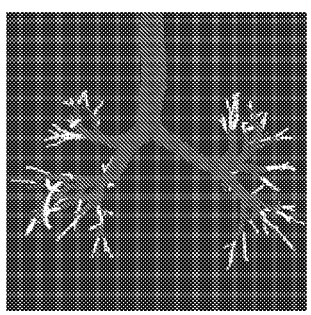 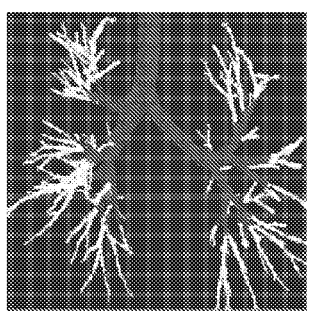 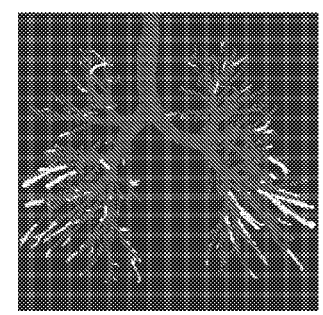
FIG. 9(d)　　　　FIG. 9(e)　　　　FIG. 9(f)
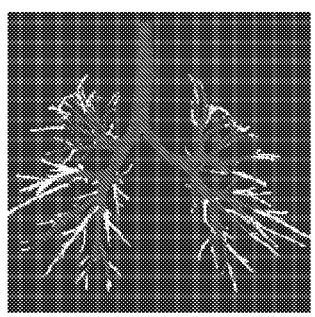 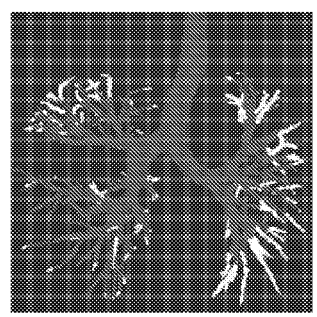 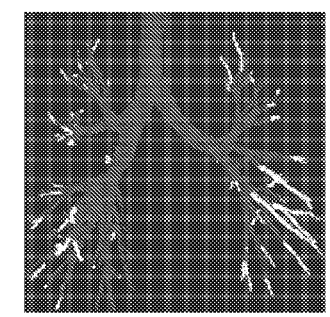
FIG. 9(g)　　　　FIG. 9(h)　　　　FIG. 9(i)

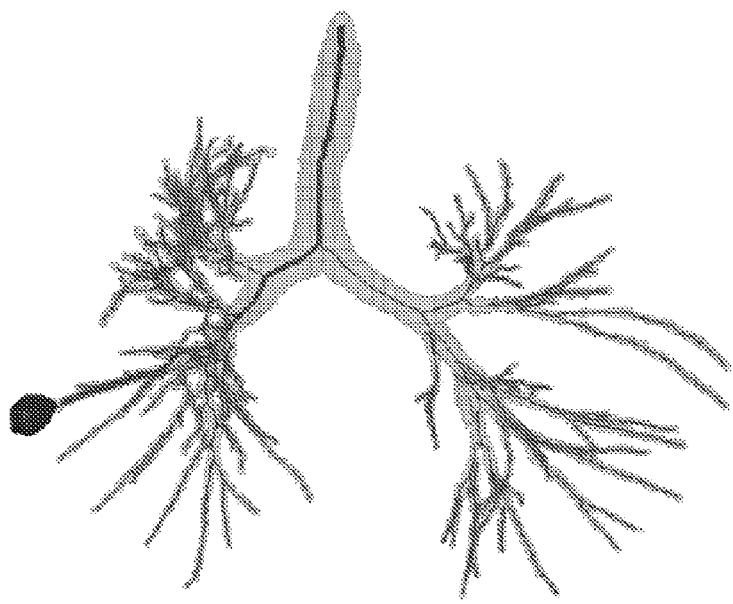
FIG. 11(a)
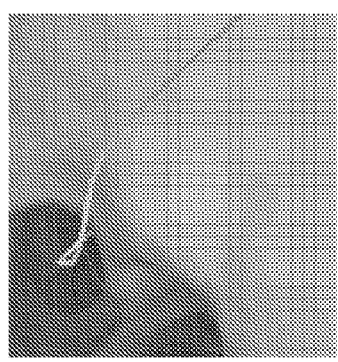 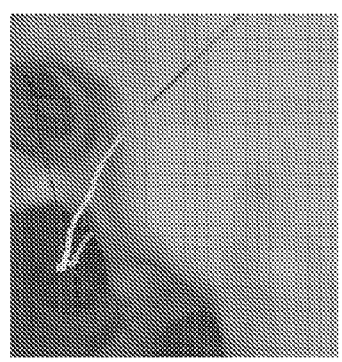 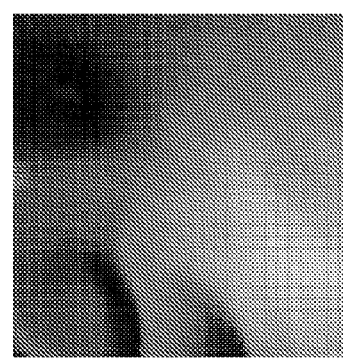
FIG. 11(b)　　　FIG. 11(c)　　　FIG. 11(d)

MEDICAL IMAGE REPORTING SYSTEM AND METHOD

REFERENCE TO RELATED APPLICATIONS

This application is the United States national phase application of Patent Cooperation Treaty No. PCT/US2009/034197, filed Feb. 16, 2009, which claims priority from U.S. provisional patent application Ser. Nos. 61/028,562, filed Feb. 14, 2008; 61/028,607, filed Feb. 14, 2008; and 61/117,334, filed November 2008, the entire content of all of which are incorporated herein.

STATEMENT OF GOVERNMENT SPONSORSHIP

This invention was made with government support under Grant Nos. CA074325 and CA091534NIH awarded by the National Cancer Institute. The government has certain rights in the invention.

BACKGROUND OF THE INVENTION

This invention relates generally to medical imaging and, in particular, to a method and system for I) reconstructing a model path through a branched tubular organ, II) automatic lymph node station mapping, and III) path or route report generation. Robust and accurate reconstruction of the human airway tree from multi-detector computed-tomography (MDCT) chest scans is vital for many pulmonary-imaging applications. For example, the reconstructed airways serve as input for algorithms that quantify airway morphology[1-4], generate virtual bronchoscopic (VB) endoluminal renderings[5-11], label human airway tree anatomy[12-16], and plan routes for bronchoscopic biopsy.[14, 17, 18] As modern MDCT scanners can detect hundreds of airway tree branches, manual segmentation and semi-automatic segmentation requiring significant user intervention are impractical for producing a full global segmentation. Fully-automated methods, however, may fail to extract small peripheral airways. These difficulties are exacerbated when trying to define endoluminal airway-wall surfaces, especially in the airway periphery. Such surfaces require a higher level of precision than the segmentation.

An MDCT chest scan is represented by a large 3D array of voxels and associated intensities[19]. Voxel intensities are measured in Hounsfield units (HU) and scanners are calibrated such that air has intensity around −1000 HU, water around 0 HU, and blood and soft tissue around 50-200 HU[20]. Thus, airways nominally appear in MDCT scans as tubes of low-intensity airway lumen surrounded by high-intensity walls. Each voxel, however, spans a non-trivial volume measured by the voxel dimensions $\Delta x$, $\Delta y$, and $\Delta z$. Voxels on the lumen/wall boundary may therefore have intermediate intensity between that of air and soft tissue[21]. This effect is particularly pronounced for peripheral airways with thin walls.

Additional complications arise during MDCT image reconstruction, which involves a choice of convolution kernels. Soft kernels, such as the Siemens B3 I f kernel, have a smoothing effect and tend to blur small airways. Sharp kernels, such as the Siemens B50f and B70f kernels, highlight image gradients but amplify high-frequency noise. Motion artifacts, non-standard patient anatomy, and airway obstructions introduce additional challenges.

Many airway segmentation methods use region-growing algorithms, which attempt to separate air and soft-tissue voxels using an HU threshold[22, 23, 12, 24]. The final segmented result is a set of air voxels connected to a seed point. Region growing is fast and assumes no prior knowledge of the shape or size of the airways. Choosing an appropriate global HU threshold is difficult, however, as the lungs are filled with air and misclassifying a single wall voxel can allow the segmentation to leak into the lung parenchyma. Filtering the image prior to initializing region growing can mitigate the leakage problem, but filtering removes small peripheral airways[24].

Several methods based upon mathematical morphology have also been proposed.[1, 25, 24, 26] Such methods typically pass a set of nonlinear filters over the image to locate candidate airway locations. A reconstruction step then rejects false candidates to produce the final segmented result. Morphological approaches are appealing because they scan the entire lung volume. Thus, unlike region-growing algorithms, they can "see" strong airway signals that are not directly connected to a seed voxel. Morphological filters are frequently slow, however, and developing an appropriate reconstruction algorithm has proven to be difficult.

Some recent methods incorporate locally-adaptive segmentation algorithms and seek to detect and stem leakages. Several algorithms propagate a wavefront through the tree. The front splits into smaller, child fronts at bifurcations. Leakage is detected when the front splits too rapidly.[27, 28] Tschirren et al. characterize leakages as having a "spongy" texture[4]. When leakage is detected, locally-adaptive algorithms typically switch to a more conservative set of parameters and re-run the segmentation. Such algorithms can be myopic as the decision to stop segmenting at a particular branch or bifurcation is usually made without benefit of global information.

SUMMARY OF THE INVENTION

This invention presents novel methodologies to segment and define accurate endoluminal surfaces in airway trees, with a focus on small peripheral bronchi. An automatic algorithm that searches the entire lung volume for airway branches poses airway-tree segmentation as a global graph-theoretic optimization problem. This algorithm has shown strong performance on 23 human MDCT chest scans acquired by a variety of scanners and reconstruction kernels. Visual comparisons with other segmentation results and quantitative comparisons with manually-defined trees indicate a high sensitivity to peripheral airways and a low false-positive rate. In addition, we propose a suite of interactive segmentation tools for cleaning and extending critical areas of the automatically segmented result, typically peripheral bronchi. These interactive tools have potential application for image-based peripheral bronchoscopic guidance, where small, terminal branches can be important visual landmarks. Together, the automatic segmentation algorithm and interactive tool suite comprise a robust system for human airway-tree segmentation. We also present a hybrid, locally-adaptive approach that defines endoluminal airway surfaces from the MDCT chest scan and previously-produced segmentation. The surfaces created by this method define the large airways with a sub-voxel level of precision and also improve the topological accuracy of the peripheral airway surfaces when compared to other approaches. We present airway-tree reconstructions produced by these new approaches that have been used in the planning and guidance of peripheral bronchoscopies of human patients. Finally, the paper concludes with a set of potential patent claims.

BRIEF DESCRIPTION OF THE DRAWINGS

FIGS. 2(a) to 2(b) show an operation of the airway section filter for a small peripheral airway.

FIG. 3 shows three views of a smooth interpolated surface connecting two airway sections. The red line is the medial axis and the black dots are the centers of the two elliptical "end-caps" of the surface.

FIGS. 4(a) to 4(b) show a toy example illustrating the proposed global graph-partitioning algorithm.

FIG. 6 shows idealized grayscale profiles of thick-walled and thin-walled airways.

FIGS. 9(a) to 9(i) show a comparison of human airway-tree segmentations produced by proposed automatic method and a previously proposed adaptive region-growing approach.[12, 23, 24]

FIGS. 11(a) to 11(d) show examples illustrating the necessity of visual landmark extraction.

DETAILED DESCRIPTION OF THE INVENTION

Figures 1A, 1B, 1C:
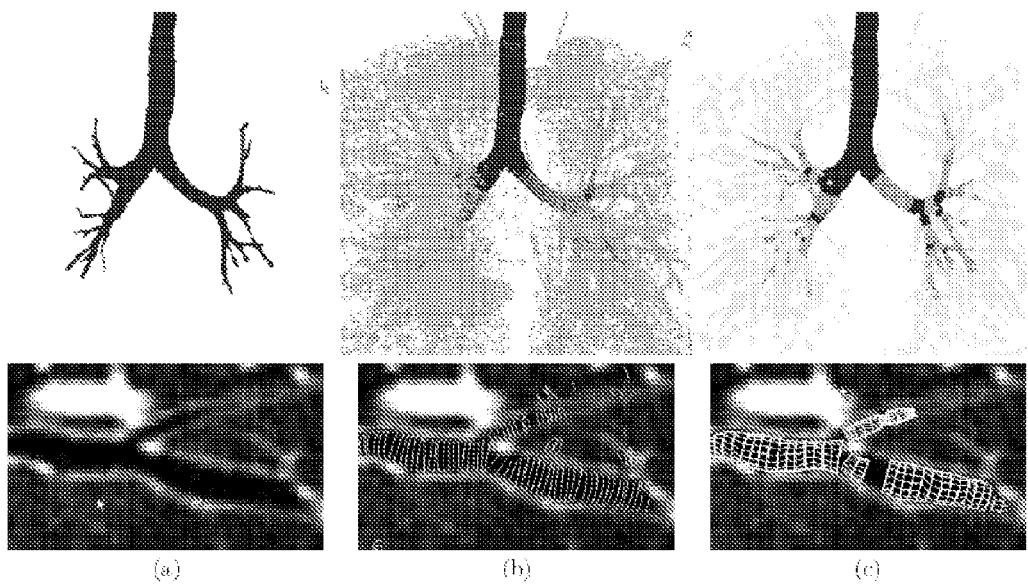
FIGS. 1(a) to 1(f) show an illustration of the proposed automatic segmentation algorithm's operation.

We propose a global automatic airway segmentation algorithm. The algorithm uses seeded region-growing to quickly and reliably extract the major airways. Leakage is avoided by smoothing the image. The algorithm also runs an efficient nonlinear filter over the entire lung volume in search of airway signatures. The filter output guides and constrains a locally-adaptive region-growing algorithm, which segments and connects entire airway branches. Finally, a novel graph-partitioning algorithm makes an optimal global decision on which branches to retain in the segmentation.

The proposed automatic segmentation algorithm extracts a large fraction of the visible airways with few false positive branches. For some applications, however, even this high accuracy rate can be insufficient. Consider, for example, image-based bronchoscope guidance for peripheral pulmonary lesions.[29, 32] Here, VB renderings are compared to live bronchoscopic video to guide the physician along a pre-defined route to the lesion. Branch bifurcation points are especially important landmarks in this process. Thus, any segmentation used to generate endoluminal surfaces for VB rendering must capture both the complete route followed by the bronchoscope on its path to the lesion and all branches visible to the bronchoscope along the way[10].

Fortunately, while manually segmenting an entire airway tree is tedious, cleaning and extending a single critical path of a nearly-correct tree can be relatively painless. We have therefore also developed a suite of interactive tools that enable the extension of an automatically segmented tree. The added airways may extend an existing route towards a peripheral region of interest (ROI) or create new bifurcation regions along an existing route to match those seen in the real bronchoscopic video. The tools enable the addition or deletion of entire airway branches with a few mouse clicks and provide an extension of the 2D "livewire" interactive segmentation paradigm enabling the definition of tiny airways overlooked by the automatic algorithm.[33, 35]

From the airway tree segmentation, our reconstruction generates a sub-voxel-precise model of the endoluminal airway-wall surfaces. While the segmentation systems focus on defining airway lumen voxels, accurate surface definition requires finding precise locations where the underlying airway walls slice through the MDCT image. The airway walls typically slice through voxels, so their accurate definition requires the partitioning the volumes of the voxels neighboring the outer surface of the segmentation into airway-lumen and airway-wall classes. While there are a variety of approaches for defining these surfaces, none yield acceptable results for the entirety of the airway tree in a reasonable amount of computational time.[5, 36, 37]

1. Organization of the Specification

The remainder of the specification is organized as follows. Sections 2 and 3 detail the automatic and interactive aspects of the proposed airway segmentation system. In Section 4 we present in greater detail the difficulties encountered when trying to extract an appropriate endoluminal airway surface from MDCT datasets. This section also describes our hybrid approach for precisely defining the large airways and quickly determining appropriate surfaces for the smaller, ill-defined peripheral airways. Section 5 presents experimental results of each airway-reconstruction component. Section 6 offers a few concluding comments.

2. Automatic Segmentation Algorithm

The proposed global segmentation algorithm proceeds in five steps, as illustrated in FIGS. 1(a) to 1(f), which is described below:

1. Conservative segmentation—A conservative segmentation consisting of the major airways is extracted via 3D region growing. To ensure that the conservative segmentation does not escape from the airways, the algorithm considers only heavily smoothed image data (Section 2.1, FIG. 1(a)).

2. Airway section filter—An efficient nonlinear filter scans the image for short airway sections. Each section gives a local airway cross-section and running-direction estimate (Section 2.2, FIG. 1(b)).

3. Branch segment definition—Sequences of airway sections sharing a common wall are connected into potential branch segments. Each branch segment is represented by a tube-like surface approximating an interior airway wall and a score measuring the magnitude of the image gradient near its surface (Section 2.3, FIG. 1(c)).

4. Branch segment connection—Neighboring branch segments are connected by smooth interpolated surfaces. The connections are optimized to minimize a cost derived from the HU value of voxels enclosed by the connection surface and subject to geometrical constraints. At this point, the segmentation problem is represented by a graph in which weighted vertices represent potential branch segments and their scores, weighted edges represent branch connections and their costs, and a single root vertex represents all branches of the conservative segmentation (Section 2.4, bottom of FIG. 1(d)).

5. Global graph partitioning algorithm—A global optimization algorithm examines the maximum achievable cumulative branch score as a function of the cumulative connection cost; i.e., given a bound on the sum of connection costs, the algorithm determines the set of branches to segment so as to maximize the sum of branch scores. The corresponding binary segmentation is a global graph partition separating "true" from "spurious" branch segments (Section 2.5, FIG. 1(e)).

Figures 1D, 1E, 1F:
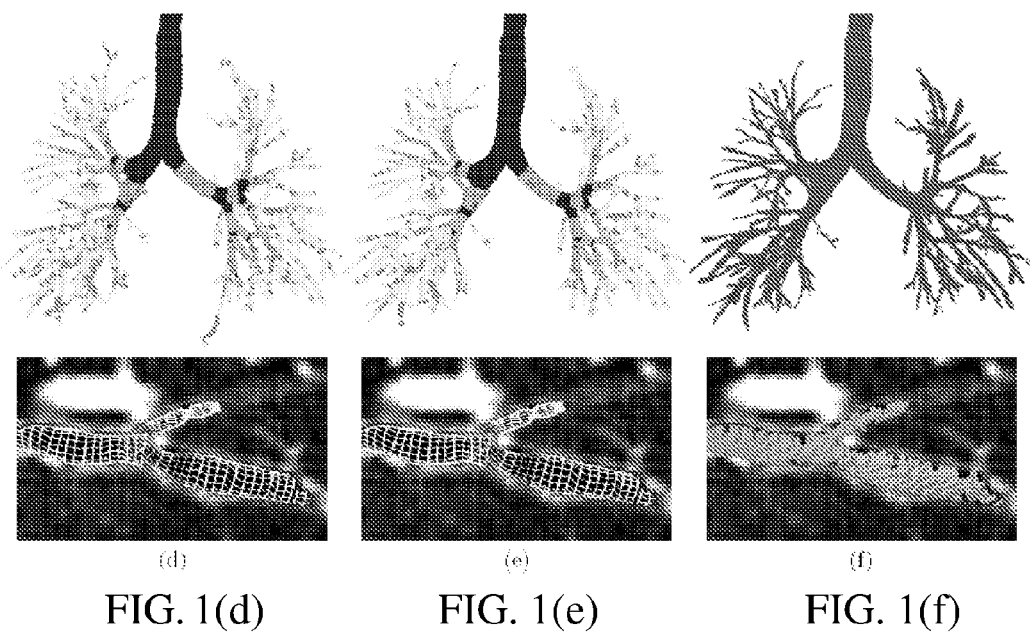

FIG. 1 shows an illustration of the proposed automatic segmentation algorithm's operation. The top images provide a global view of the algorithm's progress. The bottom images provide a focused local view of a small bifurcation in the right lower lobe. The slices in the local view are oblique cross sections with isotropic pixel dimensions of 0.5 mm. FIG. 1(a) illustrates the conservative segmentation, which contains 172,650 voxels. FIG. 1(b) illustrates the airway section filter, which produces 50,000 candidate airway sections. Each section is drawn as a light-green ellipse approximating the cross section and running direction of an airway. The filter ignores large branches that should be captured by the conservative segmentation. FIG. 1(c) illustrates the step of branch segment definition. Here, airway sections are connected into potential branch segments. Each of the 1,157 potential branch segments located by the algorithm is represented by a tubular wireframe surface. Branch segments touching the conservative segmentation are colored green. The rest are yellow. FIG. 1(d) illustrates the step of branch segment connection. Here, interpolated surfaces connecting neighboring branch segments are colored orange. Only the 624 branch segments whose connections eventually reach the conservative segmentation are drawn. FIG. 1(e) illustrates the global graph partitioning algorithm. The algorithm retains 515 branch segments. The segments in the local view are all retained. Finally. FIG. 1(f) illustrates the final binary segmentation, which contains 317,271 voxels. Individual segmentation voxels can be seen in the local view.

2.1 Conservative Segmentation

We extract the major branches of the airway tree using the adaptive 3D region-growing approach of Mori et al.[12] Similar approaches have been used by others, such as Kiraly el al.[24] The algorithm is initialized with an interactively selected root voxel in the proximal trachea. Region-growing algorithms are prone to leakage, in which the segmentation escapes from the airways, as a single weak wall voxel can open a low-intensity path between the airway lumen and the lung parenchyma.[4] Since we are interested in only the large airways, especially the main and lobar bronchi, we mitigate the explosion problem by aggressively smoothing the image data. We filter the image by clamping the maximum intensity of a voxel to −500 HU and convolving with an 3D isotropic Gaussian kernel of standard deviation $\sigma \cong 0.55$ mm. Note that this smoothed image is used only for generating the conservative segmentation. The remainder of the algorithm uses the raw (unfiltered) image data.

We emphasize that our choice of adaptive region growing for a conservative segmentation algorithm is made of convenience. It would be possible to substitute any 3D segmentation method, such as those in the references[25, 26, 4]. Region growing, however, is easy to implement and quickly produces acceptable results for the vast majority of cases. On the rare occasion that the segmentation escapes the airways, the user can interactively select an appropriate termination threshold.

2.2 Airway Section Filter

As the major airways are reliably extracted in the conservative segmentation, the remainder of the method focuses on locating and extracting small peripheral airways. In this section, we describe a nonlinear filter that searches the lung volume for short sections of peripheral airways. Each airway section is represented by a normal vector describing the airway's local running direction and an ellipse approximating its cross section in the associated normal plane. The airway sections will later constrain and guide a locally-adaptive 3D segmentation algorithm.

We imagine peripheral airways to be small, slowly varying "tubes" of dark (low HU) airway lumen voxels surrounded by bright (high HU) wall voxels. Consider a voxel $v=(i\ j\ k)^T$ lying near the medial axis of an airway. Let d be a 3D unit vector representing the local airway running direction at v. At least one of the three orthogonal slices (transverse, coronal, or sagittal) containing v cuts the airway at an angle deviating from d by less than 55°. In the appropriate orthogonal slice, the airway appears as a collection of dark pixels surrounded by a layer of bright pixels. We can detect the airway by thresholding the slice at an appropriate HU value. The airway appears as an isolated connected component of below-threshold pixels in the resulting binary image.

An individual connected component obtained by thresholding a single slice tells us little about the airway. Because the slice is not, in general, normal to d, the resulting component is a skewed representation of the airway cross section. Vitally, however, the center of mass of the component does lie near the medial axis of the airway. Thus, as peripheral branches curve gently, we can produce reasonable estimates of the local running direction and cross section of the airway by combining components obtained from neighboring slices.

FIGS. 2(a) to 2(b) illustrates the basic filter operation. Connected components A, B, and C lie in contiguous coronal slices and are not normal to the local branch running direction. Elliptical approximations for these components are therefore more eccentric than the actual branch cross section, which is nearly circular. The centers of A, B, and C, however, lie along the medial axis of the airway and a 3D regression line fit to these points yields a good approximation for the local running direction of the branch. The filter output D is obtained by projecting A, B, and C into the plane normal to the regression line and "averaging" the three resulting ellipses.

We now describe FIGS. 2(a) to 2(b) in more detail. All slices are windowed to HU∈[−1000, 200]. FIG. 2(a) gives and idealized view of the filter's operation. On the right, the three connected components lie in orthogonal viewing planes not normal to the branch running direction. The dotted line is a line of best fit for the component centers and provides a good estimate of the local airway running direction. FIG. 2(b) illustrates the filter's operation for real data. Components A, B, and C lie in consecutive coronal slices. Component D lies in an oblique cross-section normal to the estimated local running direction. Its elliptical representation is taken to be the average of the three ellipses from the coronal slice components projected onto the oblique cross-section.

The filter consists of three steps described fully in Sections 2.2.1-2.2.3. First, we construct an isotropic image volume. Next, for each slice of the isotropic volume in the three orthogonal viewing directions, we consider the 2D binary images obtained by thresholding the slice at each possible intensity. Each four-connected component of a binary, threshold image receives a score measuring the likelihood that the component represents the intersection of an orthogonal viewing plane and a branch. Finally, we combine high-scoring connected components from several neighboring slices into airway sections.

2.2.1 Isotropic Resampling

The airway section filter is most conveniently described and implemented for isotropic images. We therefore resample the input image to have isotropic voxel dimensions $\Delta x = \Delta y = \Delta z = 0.5$ mm. We obtain resampled voxel intensities via trilinear interpolation.

2.2.2 Efficiently Locating Strong Connected Components

Ideally, airway lumen would consist of pure air voxels with intensity near $-1000$ HU and airway walls would consist of pure soft-tissue voxels with intensity near 0 HU. Were this true, a single global intensity threshold would suffice to detect airways. In practice, partial-volume and point spread function effects cause the optimal threshold for separating airway lumen from wall to vary significantly throughout the image. We therefore consider connected components defined at each integer threshold between $-1000$ HU and $-600$ HU.

As we consider all possible separating thresholds, each slice in each of the three orthogonal viewing directions can contain nearly as many unique connected components as pixels. Some components will belong to peripheral branches, but most will not. We therefore assign each component a score measuring the likelihood that the component belongs to a peripheral airway.

For concreteness, consider the transverse (constant z-coordinate) slice at index k. Let (i,j) represent a pixel in the slice with corresponding intensity I(i,j). Let C represent a four-connected component of sub-threshold pixels and $\partial C$ represent the component's border pixels, which we take to be the set of pixels $(i,j) \notin C$ with a four-neighbor belonging to C. The score of C is defined to be $$S(C) = \min_{(i,j) \in \partial C} \{I(i,j)\} - \frac{1}{|C|} \sum_{(i,j) \in C} I(i,j). \quad (1)$$

Equation 1 strongly favors airway components, which consist of dark pixels surrounded on all sides by strong wall pixels. It is difficult, however, to determine a single score threshold that reliably separates airway components from non-airway components in all scans. For instance, component scores are typically higher in images reconstructed using sharp, rather than soft, convolution kernels as sharp kernels highlight image gradients. We therefore retain as many components as possible and postpone the vital airway/no-airway decision. In practice, we retain the highest-scoring 750,000 components in the entire lung volume.

We maintain a compact representation of a component consisting of the following statistics $$|C|, \sum I(i,j), \sum i, \sum j, \sum i^2, \sum j^2, \sum ij, \quad (2)$$
$$\text{and } \min_{(i,j) \in \partial C} \{I(i,j)\}$$

with each sum computed over all $O(i,j) \in C$. Both the component's score and an elliptical approximation to the component's boundary can be constructed from these statistics. To construct the elliptical approximation, we first calculate the covariance matrix $$\text{Cov}(C) = \frac{1}{|C|} \begin{pmatrix} \sum i^2 & \sum ij \\ \sum ij & \sum j^2 \end{pmatrix} - \frac{1}{|C|^2} \begin{pmatrix} (\sum i)^2 & (\sum i)(\sum j) \\ (\sum i)(\sum j) & (\sum j)^2 \end{pmatrix} + \frac{1}{12} \begin{pmatrix} 1 & 0 \\ 0 & 1 \end{pmatrix}. \quad (3)$$

The $\frac{1}{12}I$ term arises from treating each pair (i,j) as a continuous random variable uniformly distributed on the unit square centered at (i,j). In practice, this correction is vital for accurately representing small components. The boundary of the component is approximated by the 3D ellipse $$x(\theta) = P_z^T M \theta + c, \theta \in [0, 2\pi), \quad (4)$$

Where $$P_z = \begin{pmatrix} 1 0 0 \\ 0 1 0 \end{pmatrix}, \quad (5)$$

$$\theta = \begin{pmatrix} \cos\theta \\ \sin\theta \end{pmatrix},$$

$$c = \begin{pmatrix} \frac{1}{|C|} \sum i \\ \frac{1}{|C|} \sum j \\ k \end{pmatrix}, \text{ and } M = 2 \cdot \begin{pmatrix} e_1 e_2 \end{pmatrix} \begin{pmatrix} \sqrt{\lambda_1} & 0 \\ 0 & \sqrt{\lambda_2} \end{pmatrix}.$$

Here, $\lambda_1$ and $\lambda_2$ are the eigenvalues of Cov(C) with associated eigenvectors, $e_1$ and $e_2$. The ellipse swept out by $x(\theta)$ is parallel to the x-y plane and has center c. Elliptical approximations for components in coronal and sagittal slices are defined analogously.

To ensure reasonable running times, it is necessary to efficiently search the components in a slice. This can be accomplished by processing the pixels in a slice in order of increasing intensity. As the intensity values are integers in a small range, the pixels can be ordered in linear time using counting sort. The set of components is maintained using the disjoint-set forest data structure with the path-compression and union-by-rank heuristics[36].

2.2.3 Constructing Airway Sections from Connected Components

We attempt to construct an airway section from each component identified by the method of Section 2.2.2. Again, for concreteness, consider a component $C^{(k)}$ belonging to the $k^{th}$ transverse slice. Let the pair $(M^{(k)}, c^{(k)})$ describe the elliptical approximation for $C^{(k)}$ per 4. If $C^{(k)}$ belongs to an airway, it should be possible to locate components in the transverse slices k−1 and k+1 that it partially overlaps when viewed along the z-axis. Let $C^{(k-1)}$ and $C^{(k+1)}$ be one such pair with elliptical approximations $(M^{(k-1)}, c^{(k-1)})$ and $(M^{(k+1)}, c^{(k+1)})$.

If all three components belong to the same airway, the centers $c^{(k-1)}$, $c^{(k)}$ and $c^{(k+1)}$ lie near the airway's medial axis, and a good estimate for the local running direction can be obtained by fitting a line to the three points. We take the best fit to be the line passing through the point $$q = \frac{1}{3}(c^{(k-1)} + c^{(k)} + c^{(k+1)}) \qquad (6)$$

with running direction $$n = \underset{p}{\operatorname{argmax}}\left\{ \sum_{l=k-1}^{k+1} [p^T(c^{(l)} - q)]^2 \text{ such that } p^T p = 1 \right\}. \qquad (7)$$

In general, there may be multiple overlapping components in slices k−1 and k+1, and therefore many possible choices for $C^{(k-1)}$ and $C^{(k+1)}$ with each pair producing a different running direction estimate. To choose the best pair, we compute an airway section score given by $$\text{median}\{S(C^{(k-1)}), S(C^{(k)}), S(C^{(k+1)})\} \cdot G(C^{(k-1)}, C^{(k)}, C^{(k+1)}), \qquad (8)$$

where S is the score of a component per (1) and G measures the degree to which the three components agree on the local airway geometry. To measure agreement, we project the components' elliptical approximations into a common viewing plane normal to n with origin at q. Let r and u be orthonormal vectors chosen such that r, u, and n form a right-handed coordinate frame. Projecting $C^{(k)}$, for example, into this frame yields the 2D ellipse $$x_{2D}(\theta) = P(n)[(P_z^T M^{(k)} \theta + c^{(k)}) - q] = M_p^{(k)} \theta + c_p^{(k)}, \qquad (9)$$

where $$P(n) = \begin{pmatrix} r^T \\ u^T \end{pmatrix}, \; M_p^{(k)} = P(n) P_z^T M^{(k)}, \text{ and} \qquad (10)$$

$$c_p^{(k)} = P(n)[c^{(k)} - q].$$

Again, we assume peripheral airways to be gently curved with slowly varying cross sections. Thus, all three components should project to roughly the same ellipse and we define $G(C^{(k-1)}, C^{(k)}, c^{(k+1)})$ to be a correlation score equal to the area of the intersection of the three projected ellipses divided by the area of their union.

Once the pair of components maximizing (8) for component $C^{(k)}$ has been determined, we can construct the final airway section representation. The representation is given by the 3D ellipse $$x(\theta) = P(n)^T \overline{M} \theta + \overline{c}, \qquad (11)$$

which lies in the plane orthogonal to the estimated airway running direction n. Here, $\overline{c} = q + P(n)^T \overline{c}_p$ and the pair $(\overline{M}, \overline{c}_p)$ defines a 2D "average" ellipse of $(M_p^{(k-1)}, c_p^{(k-1)})$, $(M_p^{(k)}, c_p^{(k)})$, and $(M_p^{(k+1)}, c_p^{(k+1)})$.[37] As in Section 2.2.2, we retain as many airway sections as possible. Our current implementation retains the 50,000 highest-scoring sections.

2.3 Branch Segment Definition

Each valid airway section represents only a small fraction of a branch. In this section, we describe a method for connecting airway sections sharing a common wall into branch segments. Of course, we do not a priori know which airway sections belong to the same branch. In fact, many of the airway sections defined by the method of the previous section represent spurious signals and do not belong to any branch at all. We therefore propose a simple algorithm that efficiently partitions the airway sections into groups of likely branch segments.

We construct a graph G in which each vertex represents an airway section and each edge connects two vertices that may represent neighboring sections on the same branch. Represent each airway section by the quadruple $E_i = (n_i, P_i(n_i), \overline{c}_i, \overline{M}_i)$, per (11). Clearly, if $E_i$ and $E_j$ are neighboring sections, they must be physically close. They must also be represented by roughly parallel ellipses. Furthermore, the line connecting the centers of $E_i$ and $E_j$ should be roughly parallel to the estimated running direction of both $E_i$ and $E_j$. Formally we require $$\|\overline{c}_i - \overline{c}_j\| \le 3 \text{ mm}, \; |n_i^T n_j| \ge \cos(60°), \qquad (12)$$

$$\frac{|n_i^T(\overline{c}_i - \overline{c}_j)|}{\|\overline{c}_i - \overline{c}_j\|} \ge \cos(60°) \text{ and } \frac{|n_j^T(\overline{c}_i - \overline{c}_j)|}{\|\overline{c}_i - \overline{c}_j\|} \ge \cos(60°).$$

These simple geometric tests eliminate the vast majority of potential edges and ensure that G is sparse.

More importantly, we require that $E_i$ and $E_j$ be joined by a six-connected set of airway lumen voxels that can be segmented without leakage. To enforce this requirement, we construct a smooth tubular surface connecting $E_i$ and $E_j$. The interpolated surface enables us to detect segmentation leakages as it provides a good approximation for the interior airway wall. The method for constructing the interpolated surface is detailed in another work.[39] FIG. 3 gives an illustrative example. We locally segment the 3D sub-image of voxels lying between the two "end-caps" of the interpolated surface defined by the planes normal to $n_i$ and $n_j$. We use a locally-adaptive region-growing algorithm seeded at $\overline{c}_i$ with an initial threshold of −1000 HU. The region-growing threshold is gradually increased, and additional voxels are added to the local segmentation. The segmentation is successful, and the edge connecting $E_i$ and $E_j$ is added to G, if $\overline{c}_j$ is added before leakage occurs.

We augment each edge $(E_i, E_j)$ of G with the following additional information. Let $\tau$ $(E_i, E_j)$ be the interval of region-growing thresholds at which $\overline{c}_i$ and $\overline{c}_j$ are connected but leakage has not yet occurred. For each threshold in $\tau(E_i, E_j)$, assign a score to the resulting segmentation equal to the difference between the minimum intensity of a six-connected border voxel and the mean segmented voxel intensity. Let $S(E_i, E_j)$ be the maximum score over all thresholds and define $\sigma$ $(E_i, E_j)$ to be the corresponding set of segmented voxels.

Define a branch segment as a sequence of airway sections $E^{(1)}, E^{(2)}, \ldots E^{(N)}$, with $2 \le N \le 20$, such that:
1. The sections $E^{(i)}$ and $E^{(i+1)}$ are connected by an edge G for all i<N.
2. The intersection $$\bigcap_{i=1}^{N-1} \tau(E^{(i)},$$

$E^{(i+1)})$ is non-empty; i.e., there exists a common threshold at which the entire branch segment can be segmented without leakage.
3. The section centers $\overline{c}^{(1)}, \overline{c}^{(2)}, \ldots, \overline{c}^{(N)}$ connect $\overline{c}^{(1)}$ to $\overline{c}^{(N)}$ without backtracking. Formally, $(\overline{c}^{(N)} - \overline{c}^{(1)})^T(\overline{c}^{(i)} - \overline{c}^{(1)}) < (\overline{c}^{(N)} - \overline{c}^{(1)})^T(\overline{c}^{(i+1)} - \overline{c}^{(1)})$ for all i<N.

Each valid branch segment receives a score equal to the sum of its constituent edge scores. Concatenating the smooth interpolated surfaces associated with each edge produces a piecewise-smooth surface for the entire branch segment, and the union of the optimal local segmentations for each edge yields a connected segmentation of the entire branch segment without leakage.

An airway section can belong to many potential branch segments. We partition the airway sections into a collection of high-scoring, pairwise-disjoint branch segments in two steps. First, a simple dynamic programming algorithm locates the highest-scoring branch segment connecting each pair of airway sections.[39] Note that most pairs are not connected by any valid branch segment, as segment length is limited and G is sparse. Next, we consider the optimal branch segments in order of decreasing score and discard those segments that share an airway section with a higher-scoring segment. We retain the 1500 highest-scoring branch segments that remain.

2.4 Branch Segment Connection

At this point, we have extracted a connected set of conservative segmentation voxels and a collection of potential branch segments enclosed by tubular surfaces. While some branch segments contact the conservative segmentation, most are isolated "islands" of lumen voxels. In this section, we attempt to extract a path linking each branch segment with the conservative segmentation.

The output of this section will be naturally represented by a hierarchical tree $T_{conn}$, whose root vertex represents the conservative segmentation. The remaining vertices represent branch segments. The edge connecting a non-root vertex in $T_{conn}$ to its parent represents a connected set of segmented voxels joining a branch segment to either the conservative segmentation (if the parent vertex is the root) or to another branch segment. Each edge is augmented with a nonnegative weight measuring the cost of adding its connection voxels to the segmentation. Connections containing high-intensity voxels receive high cost.

Each edge in $T_{conn}$ represents one of three distinct connection types. The first is the trivial connection for a branch segment that already shares lumen voxels with the conservative segmentation. Examples of such branch segments are colored bright green in FIG. 1(d). Such edges require no additional voxels and receive zero cost.

The second connection type joins two branch segments by constructing an interpolated surface between an end-cap of the child branch and a cross-section of the parent branch. The orange interpolated surfaces in FIG. 1(d) give examples of such connections. The cost of an interpolated-surface connection is defined to be $$l \cdot C_{HU}(I_{max}). \quad (13)$$

Here, l represents the length of the connection's medial axis in mm, Imax the maximum interpolated HU value encountered along the medial axis and $$C_{HU}(I) = \begin{cases} 1, & I \le -950 HU \\ 1 + 0.02 \cdot (I + 950), & -950 < I \le -900 \\ 2 + 0.09 \cdot (I + 900), & -900 < I \le -800 \\ 11 + 0.15 \cdot (I + 800), & -800 < I \le -700 \\ \min(500, 26 + 0.8 \cdot (I + 700)), & \text{otherwise.} \end{cases} \quad (14)$$

The voxels of the connection are extracted via region growing constrained by the interpolated surface and seeded with a 26-connected voxel approximation to the connection medial axis.

The final connection type joins a branch segment directly to the conservative segmentation using a locally-adaptive region-growing algorithm. The algorithm is seeded at the center of the proximal end-cap of the branch segment. Such connections are assigned a cost of $$\frac{v}{v_{exp}} C_{HU}(\tau_c) + 300, \quad (15)$$

where V is the volume of the segmented connection (in mm$^3$), $V_{exp}$ is the expected volume of the connection given by the average cross-sectional area of the target branch (in mm$^2$) times the minimum distance between the target branch and a voxel of the conservative segmentation (in mm), $\tau_c$ is the threshold at which the connection reaches the conservative segmentation, and 300 is a constant penalty term. In practice, the volume ratio penalizes leakage and the constant penalty term ensures that such connections are used infrequently in favor of the more tightly constrained interpolated-surface connection.

We construct $T_{conn}$ from a rooted digraph D using Prim's minimum spanning tree algorithm.[38] As in $T_{conn}$, the root of D represents the conservative segmentation and the non-root vertices of D represent branch segments. An edge connecting the root to a non-root vertex is added to D for each branch segment lying within 20 mm of the conservative segmentation. We attempt to add edges in both directions between each pair of vertices in D that represent branch segments separated by less than 20 mm. Many interpolated surface connections are possible between two such branch segments. We discard anatomically implausible connections using a set of simple geometric tests and select the plausible connection minimizing (13).[39]

Note that D need not be connected. Disconnected vertices frequently arise from breathing tubes and similar structures located far from the airway tree. Such vertices are never encountered during Prim's algorithm and are simply omitted from $T_{conn}$. Note also that branch segments lying far from the conservative segmentation are non-oriented; i.e., we are not sure which end-cap of the branch is proximal (upstream) and which is distal (downstream). We can impose further useful geometric constraints on the interpolated-surface connections by adding two vertices to D for each such segment, one for each possible orientation. A simple extension to Prim's algorithm ensures that each segment appears only once in $T_{conn}$.[39]

2.5 Global Graph-Partitioning Algorithm

To this point, we have steadfastly avoided deciding which connected components, airway sections, and branch segments represented true airway signals and which represented spurious responses. Thus, the tree $T_{conn}$ may contain as many as 1500 branch segments, many of which do not belong in the airway tree. The final stage of the proposed segmentation algorithm is therefore a global graph-partitioning problem, in which vertices representing valid branch segments are retained and those representing spurious segments are discarded.

We describe the graph-partitioning algorithm for a hierarchical tree T on V vertices labeled $\{0, 1, \ldots, V-1\}$ with root(T)–0. Each non-root vertex k>0 has a unique parent P[k], a non-negative cost $c_k$, and non-negative benefit $b_k$.

Recall that for our problem the root of T represents the conservative segmentation and non-root vertices of T represent branch segments. The benefit $b_k$ of a non-root vertex is taken to be its branch segment score, as defined in Section 2.3 and the cost $c_k$ is taken to be the cost of its connection to its parent in $T_{conn}$ as defined in Section 2.4. Thus, vertices associated with strong branches receive high benefit, while branches that are separated from their parent by a high HU barrier receive high cost. As the root node is already assumed to be part of the segmentation, we set $b_0=c_0=0$.

Our goal is to separate true tree branches, typically with low cost and high benefit, from spurious branches with high cost and low benefit. The output of the algorithm will therefore be a subtree of T, which we will represent by a binary vector, $t=(t_0, t_1, \ldots, t_{v-1})^T$. The subtree t must include the conservative segmentation, so $t_0=1$. To ensure t describes a connected segmentation, we further require $t_k=1 \Rightarrow t_{P(k)}=1$ for all $k>0$; i.e., to include a branch in the segmentation, we must also include its parent in T.

A natural measure for the "quality" of a vertex k is the ratio $b_k/c_k$, which represents the marginal benefit per unit cost of adding k to the segmentation. This suggests a naive algorithm in which we choose a ratio threshold $r>0$ and define t to include all vertices connected to the root by a path consisting of vertices with benefit/cost ratios of at least r. The toy example in FIG. 4 illustrates a problem with this approach. Here, we have set our ratio threshold to r=1.0. The subtree suggested by the naive algorithm misses many low-cost, high-benefit vertices because it does not look beyond the poor ratio at vertex 1.

We now describe FIGS. 4(a) to 4(b) in more detail. The figure shows a toy example illustrating the proposed global graph-partitioning algorithm. FIG. 4(a) shows the tree T. The benefit ($b_k$, top value) and cost ($c_k$, bottom value) of a vertex are listed at its left. FIG. 4(b) shows a plot of cumulative benefit vs. cumulative cost. The solid blue line and dotted red line trace the tree knapsack problem and relaxes tree knapsack problem curves defined in (18) and (20). The black 'x' represents the cost/benefit pair achieved by the output of the Algorithm 1 for r=1.0. The solution is both a point of intersection of the two curves and the breakpoint at which the slope of the RTKP curve drops below r. The algorithm output achieves benefit B(t*)=419 for cost C(t*)=210 and excludes only vertices 11, 12, 14, and 15. The block 'o' represents the cost/benefit pair achieved by the output of a na[iota]ve algorithm described in the text. The naive algorithm fails to segment high-benefit, low-cost vertices 4, 5, 9, and 10 because it cannot see beyond vertex 1.

To overcome this problem, we consider T globally and examine the maximum achievable cumulative benefit as a function of the cumulative cost. Define the cost of a subtree $$C(t) = \sum_{k=0}^{V-1} t_k c_k \quad (16)$$

and its benefit $$B(t) = \sum_{k=0}^{V-1} t_k b_k \quad (17)$$

Given a cost budget $\gamma$, the maximum achievable benefit is $$\beta(\gamma) = \max\{B(t) \text{ such that } t \text{ is a subtree of } T \text{ and } C(t) \leq \gamma\}. \quad (18)$$

We refer to (18) as the Tree Knapsack Problem (TKP) and the function $\beta(\gamma)$ as the TKP curve.[40] The solid line in FIG. 4(b) plots β for the example in FIG. 4(a). The TKP curve is a nondecreasing function of γ. Rather than apply a ratio threshold to each vertex independently, a better approach inspects the global TKP curve and determines the solution point at which the marginal benefit-to-cost ratio dips below the ratio threshold r. Unfortunately, the TKP is NP-Hard, and, although reasonably efficient algorithms exist when the $c_k$ are small integers, tracing the TKP curve for our problem is expensive. Furthermore, the TKP curve is piecewise-constant and it can be difficult to pinpoint where the ill-defined "slope" of the curve drops below r.

We therefore consider the "envelope" function defined by a continuous-valued relaxation of the TKP. Define a relaxed subtree of T to be a real-valued vector f satisfying:

$$f_k \in [0,1] \ \forall k, f_0=1, \text{ and } f_k \leq f_{P[k]} \ \forall k>0. \quad (19)$$

Every subtree is a relaxed subtree, but the reverse is not generally true. Define C(f) and B(f) as in (16) and (17) and, for a cost budget γ, define the maximum-achievable benefit for a relaxed subtree to be $$\beta_R(\gamma) = \max\{B(f) \text{ such that } f \text{ is a relaxed subtree of } T \text{ and } C(f) \leq \gamma\}. \quad (20)$$

We refer to (20) as the Relaxed Tree Knapsack Problem (RTKP) and the function $\beta_R(\gamma)$ as the RTKP curve. The dotted line in FIG. 4 plots DR. The RTKP curve is nondecreasing and provides an upper-bound for the TKP curve. More importantly, $\beta_R$ is a piecewise-linear function of γ with non-increasing slope as (20) represents a parametric linear programming problem.[41,42] Thus, for any choice of r, the RTKP curve has a breakpoint below which its slope is at least r and above which its slope is at most r.

Remarkably, there exists a simple algorithm for locating the slope breakpoint without tracing the RTKP curve. Furthermore, for any r, the slope breakpoint occurs at a point of intersection between the RTKP and TKP curves and is therefore achievable by a non-relaxed subtree of T. The solution to the TKP at this point on the curve is given by the subtree $$t^* = \arg\max\{B(t) - rC(t) \text{ such that } t \text{ is a non-relaxed subtree of } T\}. \quad (21)$$

Algorithm 1 provides a simple linear-time method for locating t*.

---

Algorithm 1 Locate t* = argmax|B(t) − rC(t) such that t is a non-relaxed subtree of T|

1: Let [ $m_j$ : j =, 0, 1, .... V − 1] be a depth-first ordering of the vertices in T.
2: // Note that $m_A = P|m_j| = i > j$. Specifically, $m_{v-1} = 0$, the root of T.
3: $S_k \leftarrow 0$ for all k ∈ [0, .... V − 1]

```
Algorithm 1 Locate t* = argmax|B(t) - rC(t) such that t is a non-relaxed subtree of T|

4: // S_k is the maximum achievable score for a subtree of T rooted at k. On termination. S_0 = B(t*) - rC(t*).
 5: n_k ← 0 for all k ∈ [0. ..., V - 1]
 6: // Binary indicator variables used to reconstruct t*. Here, v_k = 1 => k is needed by P|k| to achieve S_{P|k|}.
 7: for all j = 0 : V - 1 do
 8:     S_{m_j} ← b_{m_j} - rc_{m_j}
 9:     for all k such that P|k| = m_j do
10:         // Because the vertices are considered in a depth-first order, S_k has already been computed.
11:         if S_k ≥ 0 then
12:             S_{m_j} ← S_{m_j} + S_k
13:             r_k ← 1
    // Finally, a top-down algorithm builds t* from the [v_k].
14: t*_k ← 0 for all k ∈ [1, .... V - 1], t*_0 ← 1
15: for all j = V - 1 : 0 do
16:     if t*_{m_j} = 1 then
17:         for all k such that P|k| = m_j do
18:             if r_k = 1 then
19:                 t*_k ← 1
20: return t*
```

Proof of these claims and a linear-time method for locating t* is provided in another work.[39]

In our current implementation, we use a conservative slope breakpoint of r=3.0. Thus, the segmentation terminates when the marginal global utility of adding additional branches drops to less than three times the marginal global cost of connecting the newly added branches to the tree. The returned segmentation is the union of the conservative segmentation, the lumen voxels of branch segments for which $t_k=1$, and the segmented connection voxels joining such branch segments to their parents in $T_{conn}$.

3. Interactive Tool Suite

The graph partitioning algorithm described in Section 2.5 highlights the global character of the proposed airway-tree segmentation algorithm. The algorithm searches the entire lung volume for branches, and considers all potential branches while making its final segmentation decisions. Thus, locally expensive connection costs that occur early in the tree can be overcome because the algorithm can "see" strong downstream branches that make incurring such costs worthwhile. Segmentation decisions for the last few visible generations of airway, however, must be made using primarily local image data. As peripheral branches frequently have weak image signatures and can appear to be disconnected from the rest of the airway tree, an automatic segmentation algorithm can miss true branches and mistakenly extract extra false branches.

Accurately segmenting these last few generations is vital for peripheral airway applications, such as planning and guiding bronchoscopy to distant lesions.[30,31,10,32] Here, the extracted airways serve two purposes. First, they provide a route for the bronchoscope to follow towards a peripheral region of interest (ROI).[18] Second, the airways that break off from the main route provide important visual landmarks for guiding the bronchoscope to its destination. We therefore identify two key interactive segmentation tasks to enable more accurate planning and guidance:

1. Route extension—The user appends airways to an existing route. The extended path may lead the bronchoscope closer to the peripheral ROI or provide a better angle from which to view or biopsy the ROI.
2. Visual landmark extraction—Once an appropriate route has been identified and, if necessary, extended, the user scans the entire route and extracts any small missed branches that may be visible to a bronchoscope traveling along the route.

To accomplish these related tasks, we have developed a suite of tools for interactively cleaning and extending an automatically segmented tree. The interactive tools are run through a graphical user interface (GUI) on a standard Windows XP PC. The user interacts with the segmentation and gray-scale image in a 3D environment built using Visual C++ and OpenGL.[43,44] The software is maintained in Visual Studio .NET 2003.

Errors introduced during the graph-partitioning algorithm described in Section 2.5 can be corrected with a few mouse clicks, as the branches and their inter-connections are simply the vertices and edges of a graph-theoretic tree. Thus, spurious branches erroneously included in the tree can be deleted and true branches separated from the segmented tree by stenosis, motion, or image noise can be added.

Figure 5A:
FIGS. 5(a) to 5(d) illustrate the live-wire capability of the proposed interactive tool suite for the case 20349-3-24.

A more challenging interactive segmentation task is the extraction of weak, single-voxel-thick airways that are missed by the airway section filter. To assist the user in locating and segmenting such small peripheral airways, we provide a fused view in which the 3D airway tree is combined with an oblique cross-sectional slice through the image data. FIG. 5(a) provides an example view. The oblique slice behaves as a projection screen for the image data—it holds a fixed position parallel to the viewing plane, but displays continually updated cross-sections as the 3D scene is rotated and panned. The cross-section data is calculated using trilinear interpolation at an isotropic sampling rate of 0.5 mm per pixel. The airway tree and a small navigation compass orient the user. The user can select the level of zoom, change the HU display windowing function, and scroll through oblique slices. FIGS. 5(a) to 5(d) are described in more detail at the end of this section.

With the oblique cross-section view, it is possible to quickly scan a critical region of the segmented tree and locate small branches that may be difficult to see in any of the three orthogonal viewing directions. To segment the airways captured in the orthogonal slice, we provide a "livewire" capability.[33,34,35] The user selects a seed point in the segmentation and hovers the mouse cursor over a point along the missing airway. A shortest-paths algorithm computes an eight-connected path from the seed point to the cursor. Pixel weights favor paths through low-intensity regions. When the user selects an acceptable path, the path's end point becomes a new seed point and the process is repeated until the branch has been completely extracted. As branches may not lie entirely in any single plane, the user can freely rotate the 3D scene at any time to obtain a better view. Pixel weights and shortest-path computations are updated on-the-fly. As live-wire is performed in arbitrary oblique cross-sections, the procedure returns a piecewise-planar sequence of floating-point 3D image locations. A post-processing step produces a 26-connected sequence of integer-valued voxel coordinates, which are added to the segmentation.

Figure 5B:
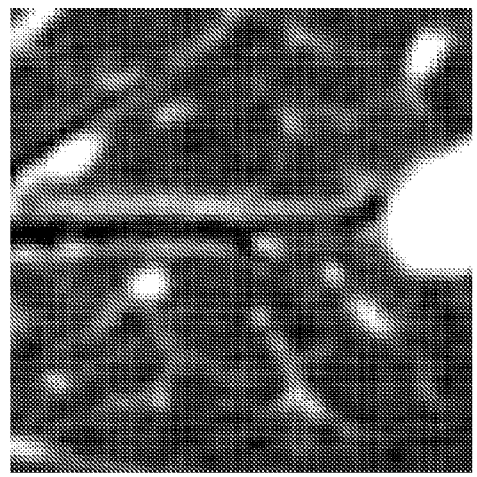
Figure 5C:
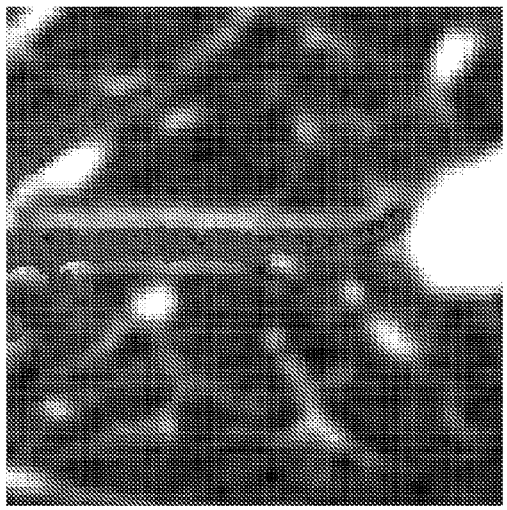
Figure 5D:
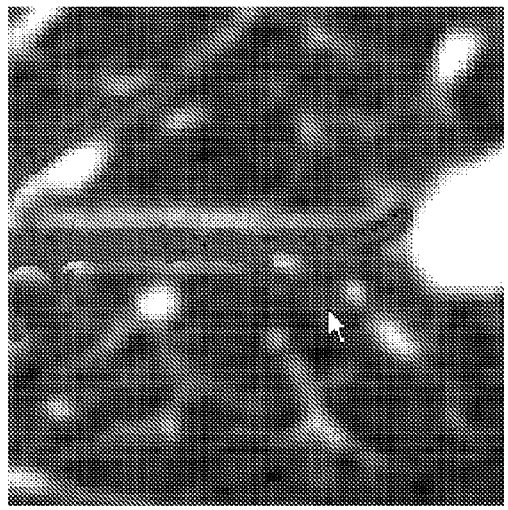

FIGS. 5(a) to 5(d) illustrate the live-wire capability of the proposed interactive tool suite for the case 20349-3-24. FIG. 5(a) shows the oblique cross-section view fused with the automatically segmented airway tree. FIG. 5(b) shows a close-up view of the oblique slice only. The data is isotropically sampled with pixel dimension 0.5 mm and windows to HU∈[−1000, −200]. The bright object on the right is a peripheral lesion. FIG. 5(c) shows the automatically generated segmentation fused with the slice. Finally, FIG. 5(d) shows a live-wire operation. The redline line connecting the segmentation to the mouse cursor indicates voxels that will be added to the segmentation.

4. Airway Surface Definition

From the airway-tree segmentation and MDCT image data we define the second component of the airway reconstruction, polygonal airway-wall surfaces.[2] To aid in image-based guidance, these surfaces are used to generate VB renderings. As such, the airway surfaces should be defined so that the resulting VB renderings accurately reflect the appearance of the airways in the bronchoscopic video feed. A review of the literature shows that existing methods do not completely address the problem of generating complete, accurate airway-wall surfaces for the entirety of the airway tree.[5,36,37] We seek sub-voxel-precise polygonal surfaces in those parts of the airway tree with strong image support; e.g., to preserve the appearance of the rings in the trachea. We also seek to accurately reflect the topology and appearance of peripheral airways that may have weak signals in the MDCT data. Currently proposed methods either: fail to work well in the poorly-defined peripheral regions[5]; optimize over gradient magnitudes, which can be ill-defined in the periphery and may not lead to a well-positioned surface[36,37]; or have long execution times in the large MDCT images of interest.[37] Below, we first describe the difficulties encountered when trying to define the airway surfaces and then present our hybrid locally-defined-isosurface/topological-dilation methodology.

4.1 Constant-HU Isosurfaces

The Marching Cubes algorithm has long been used to quickly and accurately extract polygonal surfaces from 3D medical data.[5] This method defines the walls of the large airways, such as the trachea and the main bronchi, with a sub-voxel level of precision. From a volumetric image, the Marching Cubes algorithm generates a polygonal surface by finding those locations where the grayscale values cross from dark to light through some threshold value. We have experimentally found that using the Marching Cubes method to extract a −600 HU isosurface yields polygonal surfaces that correspond well to the airway tree as observed in bronchoscopic video.[45,6,9,11] Our selection of such an isosurface can be justified with an explanation of the appearance of the airways in an MDCT image.

Large airways such as the trachea and the main bronchi are represented by dark lumen voxels with nominal Hounsfield Unit (HU) values of −1000 HU that are surrounded by brighter soft-tissue walls having nominal HU values≈50-200 HU. In large airways the walls are several voxels thick. Due to partial-volume effects and the smoothing kernels used during image reconstruction, there is not an abrupt 1200 HU difference between a dark lumen and bright walls voxel. Instead, there is a gradual transition that is spread out over multiple voxels.[21] This can be modeled as a smoothed 3D step function. With this model the interior airway surface is located at the point of maximum gradient magnitude, which also happens to coincide with the HU value halfway between the dark and light values, −400 HU.[46] FIG. 6, described in detail at the end of the section, shows an idealized example of the step-like transition between air and soft tissue in the large airways and a smoothed response similar to those observed in the large airways of MDCT chest images. The maximal gradient magnitude and the average HU value between light and dark, which occur at the same location, are marked in the plot. Even in the larger airways, however, image noise or reconstruction artifacts can lead to holes in the −400 HU-isosurface. We have found that a −600 HU isosurface, while moving the surface locations slightly, produces surfaces that are generally hole-free in the larger airways.

While this approach produces accurate surfaces for a large portion of the airway tree, it generally yields poor results in small peripheral bronchi. The cross sections of the peripheral airways can contain ten or fewer lumen voxels as opposed to the hundreds of such voxels found in the larger airways. Similarly, the peripheral airway walls are thinner than those of the major airways; the width of these walls may be smaller than the voxel resolution. The thin peripheral airway walls are often bordered on both sides by dark voxels and are therefore poorly represented by the step-edge model. FIG. 6 shows the difficulties with using the gradient magnitude response or a constant HU value to define peripheral airway walls. Because the smoothing function can be much wider than the airway wall, the maximal gradient magnitude (denoted by an X) is not well-located; the first local maximum of the gradient magnitude is too far within the dark region. This behavior would be observed in VB renderings as airways that are too closed off. Furthermore, if the airway is very thin and surrounded by dark voxels, the spread response exhibited in the MDCT image may never cross the −600 HU threshold. Without a threshold-crossing, a surface would not be defined here. As a result of these factors, a globally-defined HU isosurface generally captures peripheral airways poorly.

FIG. 6 shows idealized grayscale profiles of thick-walled (left) and thin-walled (right) airways. The dotted line represents the underlying anatomy with small values corresponding to air and large values corresponding to soft tissue. The transition region between the two is the airway wall. The solid line represents the smoothed HU profile as observed in the image. The location of the first observed local gradient intensity maximum is marked by (X) and the location of the average between air and soft-tissue HU values is marked by a short horizontal line.

4.2 Variable-HU Surfaces

The main deficiency of the previous method is that a single value defines the airway-tree isosurface. A value that produces accurate polygonal surfaces in the larger airways can result in large undefined portions of the airway-tree surface in the smaller airways. These undefined portions visually appear as holes in the VB renderings. It should not be unexpected that such an approach fails to produce appropriate surfaces for the entirety of the airway-tree. If a single global HU isosurface accurately represented the interior airway walls, the task of airway-tree segmentation would be trivial.

Figure 7:
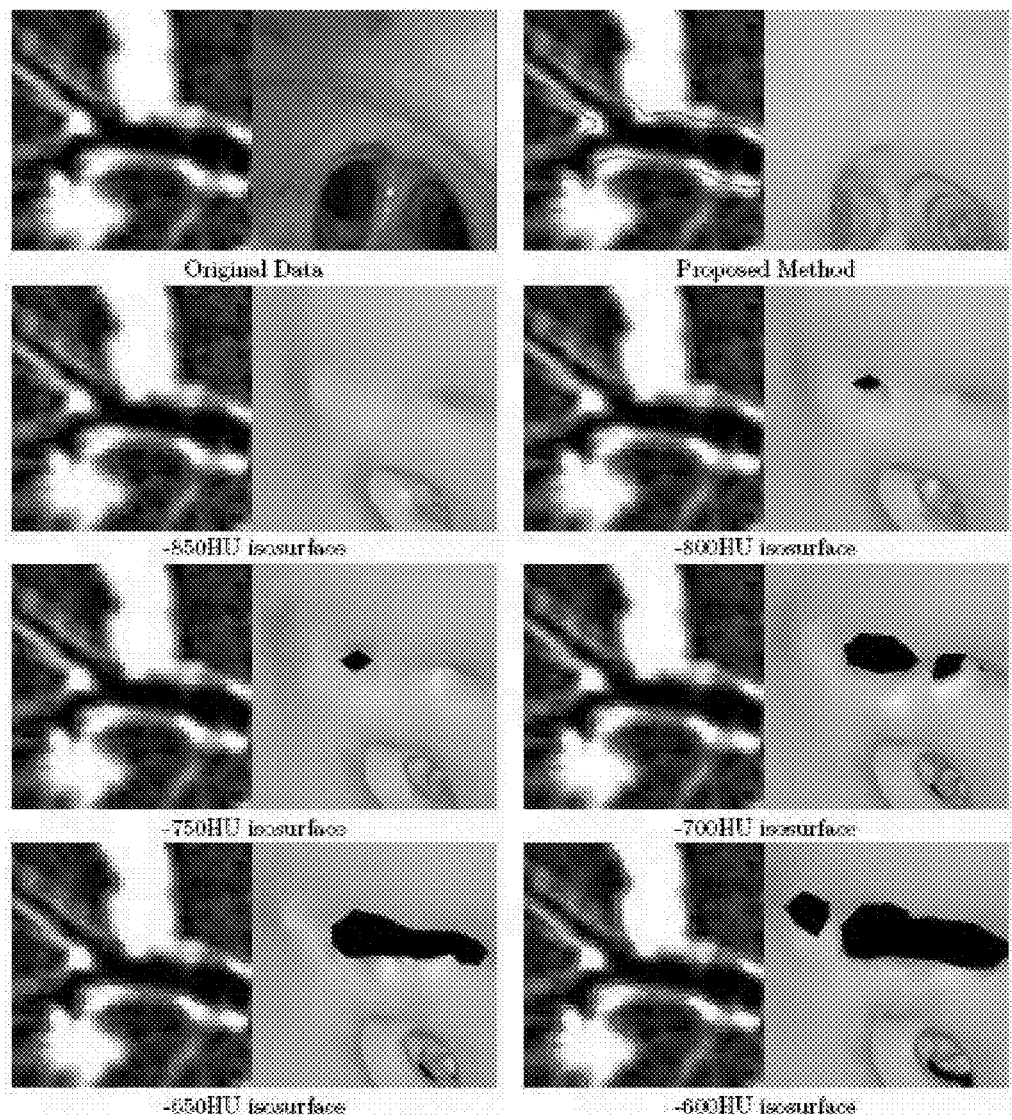
FIG. 7 shows polygonal surfaces of a peripheral airway in the right upper lobe medial segment.

The previous global approach can be improved by locally determining isosurface values. The desired airway surface could be found by combining a smoothly-varying set of locally-defined isosurfaces. While airway surfaces produced in this manner are typically better than a constant HU isosurface, they may still exhibit some shortcomings. FIG. 7 illustrates the major problem with the adaptive approach: an appropriate locally-defined isosurface cannot always be determined. The top-left part of the figure shows a peripheral airway bifurcation as seen in the MDCT image and in the bronchoscopic video feed. The bottom three rows show a variety of isosurfaces. Each row shows the intersections of the different isosurfaces with the MDCT image and VB endoluminal renderings of the isosurfaces. The pose of the virtual camera in the VB renderings corresponds to that of the real bronchoscopic camera in the video frame. These images show that the local isosurfaces are too closed off—it is impossible to see both descendant airways beyond the bifurcation. There are also holes in the surfaces generated at each local threshold—the red isosurface is not closed in the MDCT data and the black parenchymal background can be seen in most of the VB renderings. Compared to smaller peripheral bronchi, the airways in this example have a well-defined radiologic appearance in the MDCT image. The lumen voxels are dark and the airway wall is brighter and readily apparent. Yet no appropriate local isosurface exists that accurately represents these strong-signaled bronchi. Such results are not limited to the example shown; the vast majority of peripheral airways are poorly modeled by a local HU isosurface. This leads to our improved method for defining the small peripheral surfaces.

We now describe the contents of FIG. 7 in more detail. The figure shows polygonal surfaces of a peripheral airway in the right upper lobe medial segment. The original data section consists of a trilinearly-interpolated oblique cross-section of the MDCT image and a bronchoscopic video frame of the corresponding airways. The proposed method shows surfaces produced by the topological dilation approach overlaid on the same MDCT image and a VB rendering of the surfaces at the same pose as the bronchoscope in the original data. The bottom two rows of the figure depict the surfaces generated at varying HU-isosurface values. These images show that the polygonal surface created by this method can be simultaneously too conservatively and too incompletely defined. In each case, the local HU-isosurface airways are too narrow—the bifurcation that is apparent in the video frame is not completely visible in the endoluminal renderings. With the exception of the −850 HU isosurface, all the surfaces generated in this manner contain noticeable holes (the black regions above the bifurcation) in the VB renderings. The MDCT chest scan was generated by a Siemens Sensation 40 scanner with an image size of 512×512×557 and voxel resolution $\Delta x$-$\Delta y$-$\Delta z$-0.50 mm.

4.3 Segmentation-Based Surfaces

The previous strategies of finding appropriate isosurfaces in the raw image data did not make use of all relevant information available in the bronchoscopic planning process. The airway-tree segmentation S provides a voxel-level representation of the airway lumen. The surfaces derived by the Marching Cubes algorithm on the binary image of S would remedy some of the problems of the previous methods. For any S, the surfaces generated in this way would be closed and would be topologically appropriate.

While this approach fixes some problems, it also introduces new ones. The partial volume effects that lead to smooth, accurate larger-airway surfaces in the HU-isosurface approach no longer exist. Surfaces created directly from the binary image of S are blocky, since the informative smoothed transition regions and partial volume averaging are lost. Another deficiency of this approach is that our image segmentation system only extracts the dark lumen voxels. A large proportion of the underlying peripheral airways are represented by partial-volume or transition-region voxels, which are not captured in S. As a result, the segmentation-derived surface will be too conservative in these airways, leading to surfaces that are overly constricted in VB renderings.

The jaggedness and conservative definition of the binary surface can be addressed by appropriately dilating and smoothing the airway-tree segmentation. Such an approach would lose precision in the large airways by discarding the informative raw image data in the large airways, but would advantageously expand and smooth the surfaces of the small peripheral airways. This suggests a hybrid approach: use locally-defined isosurfaces to define the larger airways and the dilated segmentation to define the smaller airways.

4.4 Topological Dilation

In order to produce an accurate polygonal surface, we must appropriately dilate S. FIG. 8, which is described in more detail at the end of this section, shows an example of the errors introduced by a fixed-distance dilation of the airway-tree segmentation: branches that run parallel to one another are combined. To make VB renderings that accurately reflect the underlying airway-tree topology, we wish to avoid such errors. The objective of the dilation strategy is to set the interior airway wall as near as possible to a fixed distance dD from S without introducing intersections between topologically distinct airways. Our solution to this problem consists of four steps:

1. Extract the graph-theoretic topology of the segmented airways. This identifies the parts of the airway tree that should not be merged during the dilation.
2. Define the dilation constraints. This step identifies the locations of self-intersection in the isotropically dilated segmentation. These self-intersections locally constrain the amount of dilation that can be achieved. Additional constraints ensure that the shell of the dilated image of S is smooth.
3. Embed the constraints into a linear programming (LP) problem. The solution of the LP problem dictates the dilation distance of each component.
4. Aggregate the locally dilated components. This step begins by independently dilating each component by the distances given in the LP solution. These results are combined in a single 3D likelihood image. This image is not binary; each component's dilation distance is given by a floating point value. There is a gradual transition between voxels which are certain to be lumen (grayscale value=−100) and those certain to be lung parenchyma (grayscale value=100). The airway wall is the 0 grayscale isosurface.

In the first step, a front-propagation algorithm defines the medial axes of the airway-tree segmentation. This algorithm finds discretely-sampled medial axes that are separated by a distance of approximately 1 mm between each sample point. Each voxel in the segmentation is uniquely associated with a medial axis point, with the resulting sets comprising cross-sections of the airway lumen. Moving away from the proximal end of the trachea and using 26-connectivity, the algorithm finds the ancestors and descendants of each cross section to build the topology of the cross-sectional airway tree T.

The second step identifies the cross-sectional connected-components whose individual dilation may cause self-intersections in the surfaces derived from the topologically dilated likelihood image $I_T$. This step takes as input $d_D$ and T. The output is a list of pairs of cross-sectional components where the minimal pairwise Euclidean distance between components is less than a safety factor $d_s$, defined by $$d_s = 2d_D + \|[\Delta x, \Delta y, \Delta z]^T\|, \quad (22)$$

where $\Delta x$, $\Delta y$, and $\Delta z$ are the voxel dimensions and $\|u\|$ is the Euclidean norm of the vector u. If a pair of voxels, each on separate connected components, are separated by a distance of less than $d_s$, the surfaces derived from $I_T$ could self-intersect.[3] Not all such pairs with small separation distances, however, are problematic. In fact, the construction of T ensures that all components must be within $d_s$ of another component, because each is 26-connected to either an ancestor component, a descendant component, or both. Therefore, it is necessary to identify only those components with small separation distances that are topologically distant from one another. More formally, only those pairs separated by a Euclidean distance of at most ds that are also separated by a topological distance of at least $d_T$ should be considered in the avoidance of self-intersections. The integer value $d_T$ is the number of vertices (components) encountered on the unique path from one component to another component in T. We have experimentally found that a value of $d_T = 7$ yields appropriate results.

The final step of the process is to individually dilate each component by an appropriate amount and aggregate the results to generate $I_T$. We constrain the dilation distance $f_j$ of the $j^{th}$ component $C_j$ in the following ways:

The dilation distance for each component is upper-bounded by the desired dilation distance:

$$0 \leq f_j \leq d_D. \quad (23)$$

1. If the distance $d_{jk}$ between $C_j$ and a topologically distant component $C_k$ is less than $d_S$, then $$f_j + f_k \leq d_{jk} - (\|[\Delta x, \Delta y, \Delta z]^T\| + \in), \quad (24)$$

where $\in > 0$ is an arbitrarily small value. This prevents self intersections. We choose $\in = 0.01$.

2. If $C_i$ is the ancestor of $C_j$, then $$|f_i - f_j| \leq d_{smooth}, \quad (25)$$

where $d_{smooth}$ is the maximum allowable difference in the dilation distance between adjacent components. This ensures a smoothly-varying $I_T$. We choose $d_{smooth} = 0.25$ mm.

The objective now is to maximize the total dilation of the N components in T:

$$\max \sum_{i=0}^{N} f_i \quad (26)$$

subject to the previous constraints. The solution vector $f = [f_1, f_2, \ldots f_N]^T$ that maximizes the objective function (26) given the previous constraints is found via a linear programming solver.[47] For the airway trees we are interested in the constraint matrix is sparse and an interior-point solver finds the dilation distances quickly—the solution vector is typically found in under 500 ms.

The final step in the process is to generate the topologically-dilated image $I_T$ by independently dilating each component by the amount specified in f. $I_T$ is constructed so that it can later be blended with appropriately-offset values of the raw image data to generate a single image from which surfaces will be extracted. The grayscale value of the airway walls in $I_T$, 0, is chosen to be identical to the isosurface value that is eventually used to define the overall hybrid airway surface. For the N components in T, the voxels in the neighborhood of each component $C_i$ with associated dilation distance $f_i$ are considered. The grayscale value $I_T(x)$ of a voxel x located at 3D location $x = [x,y,z]^T$ is given by $$I_T(x) = H_\Delta \cdot \min_{i=0}^{N} [D(x, C_i) - f_i], \quad (27)$$

where $D(x, C_i)$ is the minimum distance from component $C_i$ to voxel x and $H_\Delta$ controls the gradient magnitude of the likelihood image. Varying $H_\Delta$ influences the surface generated by Marching Cubes on $I_T$. Because each voxel is represented as a 16-bit integer in memory, the partitioning of voxels by Marching Cubes can only occur in a finite number of ways. For instance, the isosurface of a binary image always follows the voxel boundaries. Increasing $H_\Delta$ increases the number of possible voxel partitions, leading to a smoother surface. As long as the value of $H_\Delta$ is sufficiently large, its exact value has little effect on the placement of the surfaces. The results in this paper are generated with $H_\Delta = 100$.

Figures 8A, 8B, 8C, 8D:
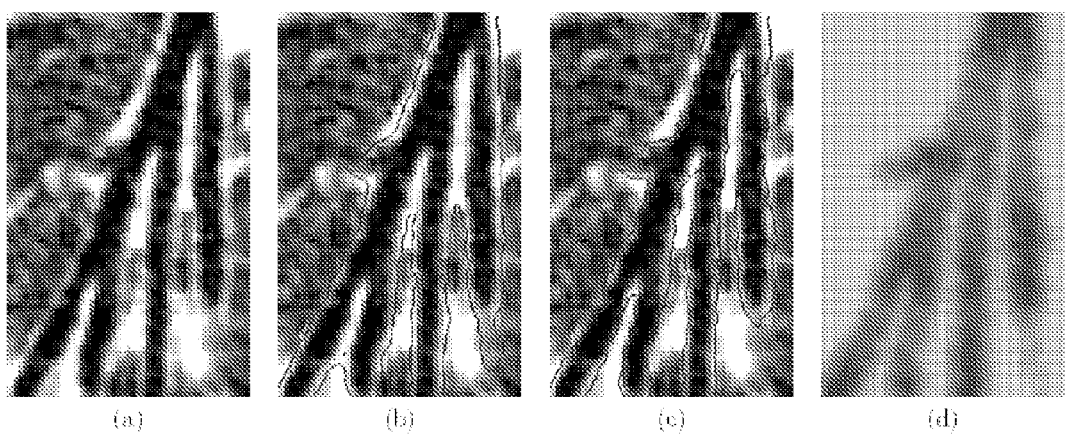
FIGS. 8(a) to 8(d) show oblique cross-sections of parallel peripheral branches at generations 6, 7, 8 and 9 in the right middle lobe medial segment.

FIGS. 8(a) to 8(d) show oblique cross-sections of parallel peripheral branches at generations 6, 7, 8 and 9 in the right middle lobe medial segment. Trilinear interpolation is used to generate the cross-section from the MDCT image in FIG. 8(a). FIG. 8(b) shows the same data with the surfaces (red) generated using a constant dilation of 1.0 mm. FIG. 8(c) shows the surfaces of the proposed topological dilation method. Distinct airways are combined together in the constant dilation scheme, but are distinct in the newly-proposed method. FIG. 8(d) shows an oblique cross-section of the image $I_t$ created during the topological dilation procedure. The MDCT chest scan was generated by a Siemens Sensation 16 scanner with an image size of 512×512×544 and voxel resolution $\Delta x = \Delta y = 0.68$ mm, $\Delta z = 0.50$ mm.

4.5 Variable-HU Threshold Estimates

At this point, there exist two 3D images: the topologically-dilated likelihood image $I_T$ and the raw MDCT image I. These two images are combined to create a blended likelihood image I8 from which a single airway surface is to be defined. The task is to now determine where I will produce appropriate isosurfaces and where $I_T$ will have to be used. For those regions where I adequately defines the airway wall, an appropriate local HU-threshold value must be chosen for the isosurface. By appropriately combining the grayscale values of I and $I_T$, we use Marching Cubes to define the overall airway surfaces in $I_B$.

The first step in the blending process is to find the strength of the airway wall surrounding each component. This enables the determination of a local HU isosurface, if it exists. While many thresholds may be valid, the best threshold is the one that completely defines the most open and reasonable airway surface possible. That is, the airway surfaces should reflect the topology of the underlying airway walls and should not be too "closed in." These requirements correspond to finding the maximal HU-threshold value such that the local isosurface surrounding a component is without holes. To find such a threshold, the connected components are first eroded slightly to ensure that no component has started to encroach into airway-wall voxels. For each eroded component $C_i^E$ we examine the set of 18-connected paths $P^i$ that emanate from $C_i^E$ and traverse through I until they are a reasonable distance from $C_i^E$. Each path originates in an airway lumen and goes through the airway wall. For each path traversal $p_k$ in $P^i$, the maximal HU value $H_{max}^k$ encountered is stored. A component is assigned a threshold estimate $\hat{T}(C_k^E)$ by $$\hat{T}(C_i^E) = \min_{p_k \in P^i} [H_{max}^k]. \tag{28}$$

We use an efficient dynamic programming algorithm to compute the local threshold estimates.[48]

4.6 Overall Likelihood Image

A locally-scaled likelihood image $I_s$ is created from I. By appropriately offsetting each HU value of I to produce $I_s$, we create an image in which a single grayscale isosurface defines the airway walls. As a result, the Marching Cubes algorithm can directly define the polygonal airway surface from $I_s$. The previously found threshold estimates, which define an isosurface that is known to be without holes, are valid offsets. The threshold estimates of neighboring components can vary greatly, however, resulting in sharp deviations in the 0-isosurface when using the raw component threshold estimates as offsets. These high-frequency artifacts are not present in the underlying airway walls. Therefore, we employ a bottom-up dynamic programming algorithm that works from the terminal airway-tree bronchi back up to the trachea to define a smoothly-varying function of the original threshold estimates. This algorithm strongly penalizes smoothed thresholds that are greater than the local threshold estimate.

The grayscale value of a voxel in $I_s$ is the HU value of the voxel at the same location in I shifted by a smoothed threshold value. Each voxel location in Is and I is associated with a component in T. The associations are chosen such that the set of voxels in the neighborhood N, of a component $C_i$, which are geometrically closer to $C_i$ than any other component, are grouped with $C_i$. With the voxel-component associations, the grayscale values of Is are assigned by $$\forall C_i \in T, I_S(N_i) = I(N_i) - T_{smooth}(C_i). \tag{29}$$

This centers the airway wall about a grayscale value of 0. A blended likelihood image $I_B$ is generated from weighted sums of the voxels in $I_T$ and $I_S$. The weighting coefficients assigned to an individual voxel in each image are determined by the smoothed component thresholds. Components with thresholds above an upper threshold $T_H$ have well-defined walls—only $I_S$ is used to define these voxels. Components with thresholds below a lower threshold $T_L$ have poorly-defined walls—only $I_T$ defines these voxels. We have achieved good results with an immediate transition at $T_H = T_L = -675$ HU. It is also possible to smoothly blend the images in the transition region by $$I_B(x_i) = I_S(x_i) \cdot \frac{1}{T_R}(T_{smooth}(C_i) - T_L) + I_T(x_i) \cdot \frac{1}{T_R}(T_H - T_{smooth}(C_i)), \tag{30}$$

with $T_R = T_H - T_L$. Finally, the polygonal airway-wall surface is generated by extracting the 0 HU isosurface from $I_B$ via Marching Cubes.

5. Experimental Results

5.1 Automatic Segmentation Algorithm

We have applied the proposed automatic segmentation algorithm to more than 40 MDCT chest scans to date. The images were acquired by four different scanners and reconstructed using three different kernels. All were successfully segmented using the same set of algorithm parameters. The algorithm's running time, detailed in Table 1, fits comfortably within a clinical workflow for image-guided bronchoscopy.

TABLE 1

Proposed automatic segmentation algorithm running times on a dual-core 2.6 GHz PC with 4 GB RAM running Windows XP. Running times are averaged over ten cases. No case required more than four minutes of processing time.

| Step (section number) | Mean running time (in seconds) | Standard deviation (in seconds) |
|---|---|---|
| Conservative segmentation (2.1) | 4.3 | 0.9 |
| Isotropic interpolation (2.2.1) | 21.4 | 5.8 |
| Connected component filter (2.2.2) | 98.5 | 37.5 |
| Airway section construction (2.2.3) | 14.0 | 3.7 |
| Branch segment definition (2.3) | 22.6 | 3.1 |
| Branch segment connection (2.4) | 4.4 | 0.8 |
| Graph partitioning algorithm (2.5) | <0.1 | 0.0 |
| Total | 2 min 46 sec | 41.7 |

FIGS. 9(a) to 9(i), described in greater detail in the next paragraph, depict results comparing segmentations obtained using the proposed algorithm with those obtained by a previously proposed adaptive region-growing algorithm for nine typical cases.[23,12,24] The threshold for the adaptive region-growing algorithm was manually tuned to achieve the best possible result and, when possible, small leakages were manually removed from the region-growing result. Even in cases where the region-growing approach appears to perform well, the proposed algorithm locates significant additional airways.

FIGS. 9(a) to 9(i) compare human airway-tree segmentations produced by proposed automatic method and a previously proposed adaptive region-growing approach.[12,23,24] The figures are renderings of the binary segmentation results. Blue voxels were segmented by both methods. Green voxels were uniquely segmented by the proposed method and red voxels were uniquely segmented by the region-growing method. The respective case numbers for each result are h001, h007, 21405-3a, 21405-16, 20349-3-7, 20349-3-15, 21405-57, 21405-58, and 21405-60. The images for FIGS. 9(a) and 9(b) were acquired using a Phillips MX8000 scanner and reconstructed using a D kernel. The images for FIGS. 9(c) and 9(d) were acquired using a Siemens Sensation 16 scanner and reconstructed using a b31 kernel. The images in FIGS. 9(e) and 9(f) were acquired using a Siemens Sensation 16 and reconstructed using a b50 kernel. The image in FIG. 9(g) was—acquired using a Siemens Emotion 16 scanner and reconstructed using a b50 kernel. The image in FIG. 9(h) was acquired using a Siemens Emotion 16 scanner and reconstructed using a b41 kernel. The image FIG. 9(i) was acquired using a Siemens Sensation 40 scanner and reconstructed using a b50 kernel.

We have also compared the proposed algorithm with a manually-defined "gold-standard" tree for a single case (21405-3a, illustrated in FIG. 9(c)). The manually-defined tree consisted of 268 branches and was produced without reference to the output of the proposed algorithm. Table 2 summarizes the results, which are organized by anatomical significance. The performance of the proposed algorithm remains strong even several generations below the segmental bronchi, while the adaptive region-growing approach misses one segmental bronchus entirely (LB*) and extracts only a small portion of another (LB[5]). The proposed method produced no false airways, although it did extract three small peripheral branches that were not present in the manually defined tree. These branches were confirmed by direct inspection of the image data.

TABLE 2

Comparison of proposed automatic segmentation algorithm to manually defined "gold standard" tree for case 21405-3a (image dimensions: 512 × 512 × 606 voxel dimensions: $\Delta x = \Delta y =$ 0.67 mm, $\Delta z = 0.5$ mm). Anatomical labels were defined with physician assistance following the nomenclature of Netter [49].

| Bronchial order | Number of branches in manually defined tree | Proportion of Correctly Extracted Airways | |
|---|---|---|---|
| | | Proposed Method | Adaptive RG[23,12,24] |
| Main/Lobar | 17 | 100% | 100% |
| Segmental | 20 | 100% | 91% |
| 1$^{st}$ generation subsegmental | 38 | 94% | 58% |
| 2$^{nd}$ generation subsegmental | 58 | 87% | 39% |
| ≥3$^{rd}$ generation subsegmental | 138 | 73% | 26% |

5.2 Segmentation for Image-Guided Bronchoscopy

The improvements afforded by the proposed automatic and interactive segmentation methods are especially important for image-based planning and guidance of peripheral nodule biopsy.[10] This section describes two example cases that highlight the utility of the complete segmentation system. We have successfully used segmentations produced by the proposed system to help plan and guide live bronchoscopies to peripheral lesions using a 2.8 mm Olympus ultrathin bronchoscope.[18,32]

5.2.1 Route Extension

Consider the example in FIGS. 10(a) to 10(f), described in more detail at the end of Section 5.2.2, from case 20349-3-29. The green object is a small physician-defined lesion in the periphery of the left upper lobe. The adaptive region-growing algorithm is blocked by a damaged airway just beyond the superior-division bronchus (FIG. 10(a)). The proposed algorithm segments the airway in order to reach an entire subtree of strong branches (FIG. 10(b)). This improvement is important, but still insufficient, as the best 3D route to the peripheral lesion provided by the automatically segmented result still ends nearly 40 mm short of the lesion. Using the livewire capability of the interactive tool suite, however, we were able to extend the route to within 15 mm of the lesion (FIG. 10(c)).

5.2.2 Visual Landmark Extraction

Figure 10A:
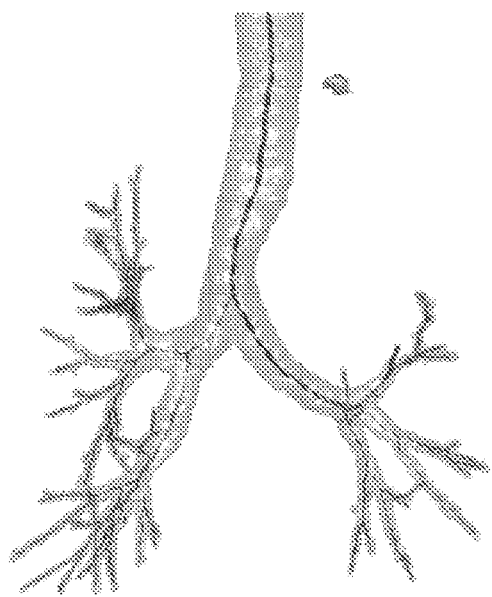
FIGS. 10(a) to 10(f) show illustrations of the entire proposed airway segmentation system for case 20349_3_29.
Figure 10B:
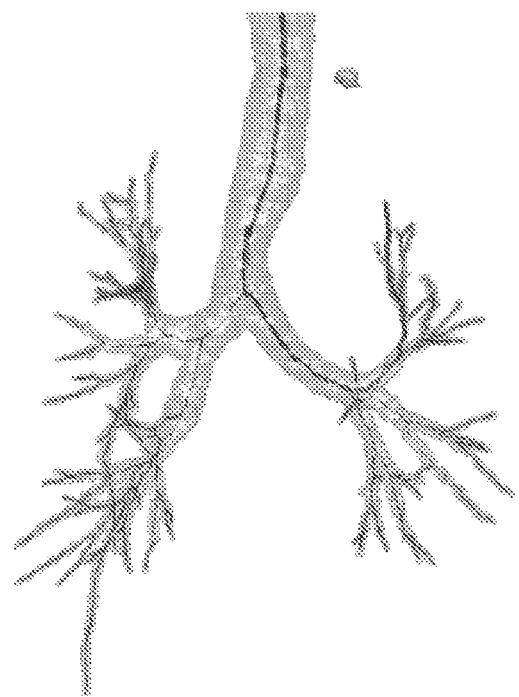
Figure 10C:
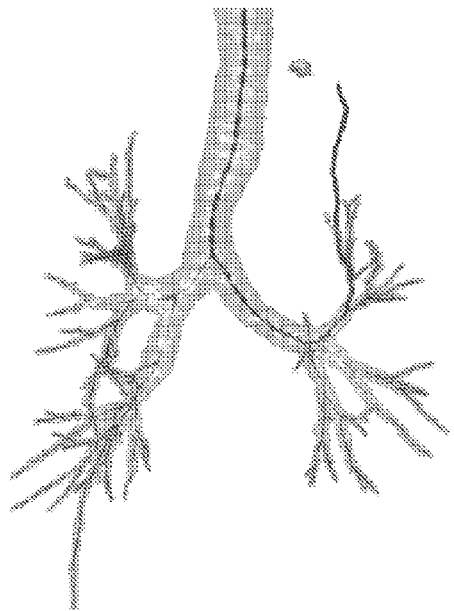
Figure 10D:
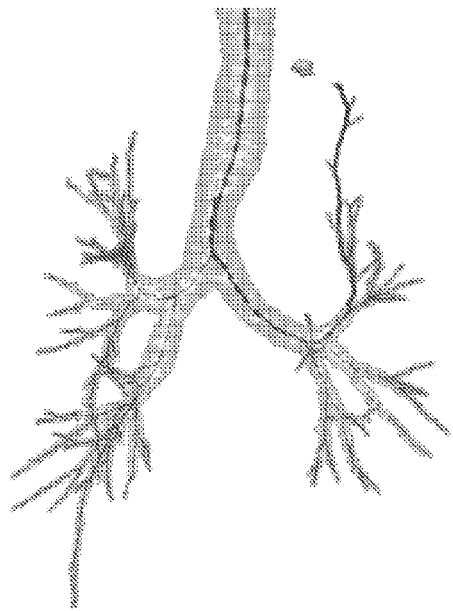

The extended segmentation in FIG. 10(c) provides a route to the lesion, but is still not complete. Again, using the livewire capacity of the proposed interactive tool suite, we added four thin, leaf branches along the path from the proximal trachea to the lesion. FIG. 10(d) depicts the final result.

A second case, 20349-3-24, provides a striking example illustrating the necessity of the visual landmark extraction step. Here, the automatically segmented result illustrated in FIG. 11(a) already provides a complete route to the lesion. The automatic segmentation, however, missed two small branches along the route that were later added interactively. The added branches consist of fewer than 100 voxels, which represents less than 0.05% of the total segmentation volume, but dramatically affect virtual bronchoscopic views encountered along the path to the lesion. FIG. 11(b)-(d) provides an example, in which one of the interactively added branches, located eight generations deep in the tree, changes the VB rendered view from a bifurcation to a trifurcation. A bronchoscopic video view confirms the correctness of the interactively-extended result. FIG. 11 is described in greater detail at the end of this section.

Figure 10E:
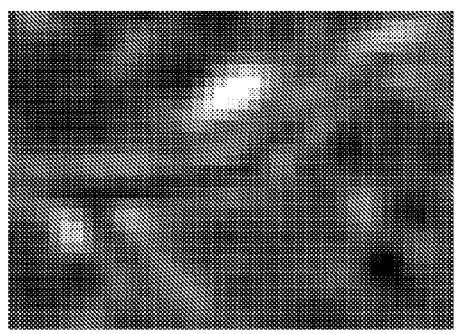
Figure 10F:
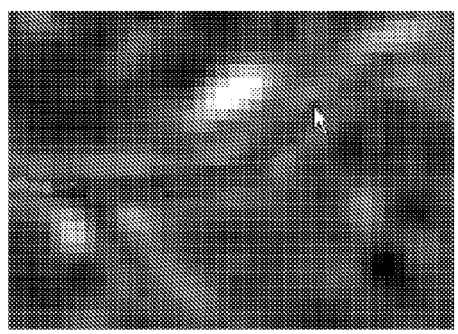

FIGS. 10(a)-(f) illustrate the entire proposed airway segmentation system for case 20349_3_29. The green object is a physician-defined peripheral lesion.[46] FIG. 10(a) illustrates the best achievable segmentation using adaptive region growing with a manually selected pre-filter and threshold. The best 3D route stops 74 mm short of the lesion. FIG. 10(b) illustrates the segmentation produced by the proposed algorithm adds, which adds an entire subtree in the left upper lobe. The best 3D route, however, is still 38 mm short of the lesion. In FIG. 10(c), the proposed interactive tool suite extends the best 3D route from FIG. 10(b) to within 15 mm of the lesion. The route is still ill-suited for image-guided bronchoscopy as it lacks several key bifurcations. FIG. 10(d) illustrates the addition of four small branches along the extended route to complete the result. Finally, FIGS. 10(e) and 10(f) show illustrations of the interactive live-wire tool during the route-extension step. Note the small airway at the bottom that will be added during visual landmark extraction. Pixels in the oblique cross-section are isotropically sampled at $\Delta x - \Delta y = 0.5$ mm and the data is windows to HU$\in$[1000, −200].

FIGS. 11(a) to 11(d) illustrate the necessity of visual landmark extraction. FIG. 11(a) shows the exterior view of the automatically segmented airway tree for case 20349-3-24. The red object is a physician-defined peripheral lesion. The blue line represents the best 3D route to the lesion. Both FIGS. 11(b) and 11(c) present endoluminal renderings with the virtual bronchoscope positioned in the 8th generation airway along the route. The rendering in FIG. 11(b) was generated using the automatically segmented result. The segmentation used to generate FIG. 11(c) was extended using the live-wire functionality of the proposed system. FIG. 11(d) shows a video frame captured with a 2.8 mm Olympus XP 160F ultrathin bronchoscope confirms the existence of the additional branch.

5.3 Airway Surfaces

Like the segmentation algorithm, our airway-surface methodology has been applied to a number of human cases. In light of our current research goals, we are particularly interested in using the surfaces in the planning and guidance of peripheral bronchoscopic procedures. To date, these surfaces been used in our planning and reporting systems in eleven human MDCT chest scans containing a total of twenty suspect peripheral lesions[10,50]. Of the cases considered, live procedures have been performed in eight patients to a total of eleven ROIs.[32] Table 3 shows the computational time requirements needed to generate the surfaces in five peripheral cases. The table's top two rows provide the size of the segmentations and the numbers of connected components in the medial-axes tree extracted from each patient's MDCT scan. These factors influence the running times of the surface generation routine. The same dual core 2.6 GHz, 4 GB RAM Windows XP PC used to generate the airway-tree segmentations above was used to define the surfaces.

TABLE 3

A summary of the cases used to test the computational time requirements of the endoluminal-surface component of the airway reconstruction. The top two rows summarize the airway-tree segmentation for each patient. The bottom portion provides the execution times of the surface generation, omitting the time required for file input/output.

| Patient | 23 | 24 | 25 | 29 | 30 | Average |
|---|---|---|---|---|---|---|
| # of voxels in segmentation | 232,009 | 195,894 | 219,488 | 310,890 | 368,006 | 265,257 |
| # of connected-components | 4,491 | 4,228 | 3,642 | 2,637 | 4,680 | 3,936 |
| Airway-surface runtime (sec) | 76 | 73 | 67 | 71 | 106 | 78.6 |

FIG. 7 provides a comparison of a bronchoscopic video frame, the endoluminal surfaces derived by our method, and isosurfaces derived using various local thresholds of a peripheral airway. The surfaces defined by our method correspond well with airways observed in the video while those generated at various local thresholds do not. FIGS. 11(b)-(d) also gives a comparison of the endoluminal surface renderings with a live video frame in a different patient. This figure shows the importance of extracting appropriate surfaces for all peripheral airways along a route. If presented with the airway reconstruction in FIG. 11(b), a physician could become disoriented when observing the live video in FIG. 11(d). The view in FIG. 11(c) shows a VB rendering containing airways defined by the automatic and interactive segmentation methodologies as well as the endoluminal surface methodology.

Figure 12:
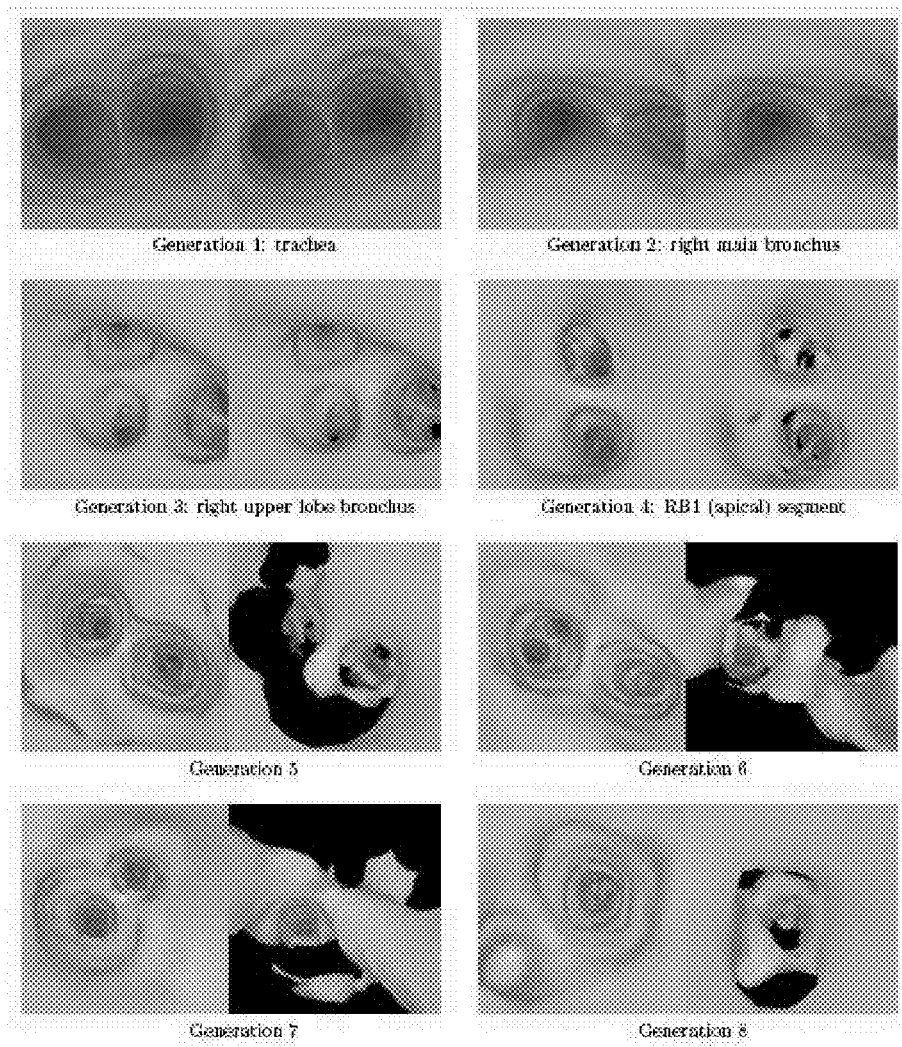
FIG. 12 shows endoluminal renderings comparing surfaces defined using the proposed blended method with those defined using a constant −600 HU isosurface threshold.

FIG. 12 depicts the surfaces created by the proposed method and those of the −600 HU isosurface at various locations along a path to the airway periphery. The two methods produce similar results in the trachea and right main bronchus. Beginning in generation 3, the right upper lobe trifurcation, black holes begin to appear in the −600 HU isosurface. The surfaces of the proposed method show the transition region between the variable-HU surface and the topologically-dilated surface in generation 5. The −600 HU isosurface significantly degrades at beyond this location in the airway tree.

6. Conclusion

The proposed airway reconstruction methods contain several novel components. Efficient algorithms for locating short sections of airway and combining them into tubular branch segments enable us to quickly extract branch-level information from the entire lung volume. Thus, the final segmentation is produced using information gathered from the entire airway tree. The branch segments themselves are extremely flexible and can represent curved branches and stenosed airways.

We have found that the algorithm performs well on images acquired by a variety of scanners and reconstruction kernels. Visual comparisons with the output of a previously proposed adaptive region-growing approach and quantitative comparisons with a manually defined tree indicate a high sensitivity to peripheral airways and a low false-positive rate. Furthermore, a suite of interactive tools has shown promise for rapidly cleaning and extending the segmentation in important local regions. Together, the global automatic segmentation algorithm and interactive tool suite comprise a robust system for human airway-tree segmentation. Because we are interested in presenting the airway reconstruction to the physician in image-based reports and bronchoscopic guidance systems, accurate airway-wall surfaces are needed. Previously-proposed methods do not completely extract well-defined airways or cannot extract the airways in a timeframe appropriate for clinical use. To overcome these problems we have presented a new approach to extract the interior surfaces of the airway tree using the MDCT image and the previously-described airway-tree segmentation. Airway reconstructions defined by the methods presented in this paper are currently being used in clinical practice for the presentation of bronchoscopic-route plans and subsequent live guidance of bronchoscopic procedures.[32,51,10]

RECONSTRUCTING REFERENCES

1. C. Pisupati, L. Wolff, W. Mitzner, and E. Zerhouni, "Segmentation of 3D pulmonary trees using, mathematical morphology," Mathematical Morphology and Its Applications to Image and Signal Processing, pp. 409-416, May 1996.
2. F. Preteux, C. Fetita, P. Grenier, and A. Capderou, "Modeling, segmentation and caliber estimation of bronchi in high-resolution computerized tomography," Journal of Electronic Imaging?, pp. 36-45, January 1999.
3. A. P. Kiraly, J. M. Reinhardt, E. A. Hoffman, G. McLennan, and W. E. Higgins, "Virtual bronchoscopy for quantitative airway analysis," in SPIE Medical Imaging 2005: Physiology, Function, and Structure from Medical Images, A. A. Amini and A. Manduca, eds., vol. 5746, pp. 369-383, April 2005.
4. J. Tschirren, E. A. Hoffman, G. McLennan, and M. Sonka, "Intrathoracic airway trees: segmentation and airway morphology analysis from low-dose CT scans," IEEE Transactions on Medical Imaging 24, pp. 1529-1539, December 2005.
5. W. E. Lorensen and H. E. Cline, "Marching cubes: A high resolution 3D surface construction algorithm," Computer Graphics 21, pp. 163-169, July 1987.]
6. J. P. Helferty, A. J. Sherbondy, A. P. Kiraly, and W. E. Higgins, "System for live virtual-endoscopic guidance of bronchoscopy," in IEEE Conf Computer Vision and Pattern Recognition, 3, pp. 68-75, 20-26 Jun. 2005.
7. K. Li, X. Wu, D. Z. Chen, and M. Sonka, "Optimal surface segmentation in volumetric images—a graph-theoretic approach," IEEE Trans. Pan. Anal. Machine Intell. 28, pp. 119-134, January 2006.
8. A. Saragaglia, C. Fetita, F. Preteux, and P. A. Grenier, "Automated volumetric approach for quantifying bronchial wall remodeling in MDCT," SPIE Conf. on Mathematics of Data/Image Pattern Recognition, Compression, and Encryption with Applications IX vol. 6315(1), p. 63150M, 2006.
9. J. P. Helferty, A. J. Sherbondy, A. P. Kiraly, and W. E. Higgins, "Computer-based system for the virtual-endoscopic guidance of bronchoscopy," Computer Vision and Image Understanding 108, pp. 171-187, October-November 2007.

10. J. D. Gibbs, M. W. Graham, and W. E. Higgins, "Integrated system for planning peipheral bronchoscopic procedures," in SPIE Medical Imaging 2008: Visualization, Image-Guided Procedures and Modeling, M. I. Miga and K. R. Cleary, eds., 6918, 2008.
11. W. E. Higgins, J. P. Helferty, K. Lu, S. A. Merritt, L. Rai, and K.-C. Yu, "3D CT-video fusion for image-guided bronchoscopy," Computerized Medical Imaging and Graphics, 2008 (in press).
12. K. Mori, J. Hasegawa, Y. Suenaga, and J. Toriwaki, "Automated anatomical labeling of the bronchial branch and its application to the virtual bronchoscopy system," IEEE Trans. Medical Imaging 19, pp. 103-114, February 2000.
13. J. Tschirren, G. McLennan, K. Palagyi, E. A. Hoffman, and M. Sonka, "Matching and anatomical labeling of human airway tree," IEEE Trans. Medical Imaging 24, pp. 1540-1547, December 2005.
14. K. Mori, S. Erna, T. Kitasaka, Y. Mekada, I. Ide, H. Murase, Y. Suenaga, H. Takabatake, M. Mori, and H. Natori, "Automated nomenclature of bronchial branches extracted from CT images and its application to biopsy path planning in virtual bronchoscopy," in Medical Image Computing and Computer-Assisted Intervention, J. Duncan and G. Gerig, eds., 3750, pp. 854-861, 2005.
15. M. W. Graham and W. E. Higgins, "Globally optimal model-based matching of anatomical trees," in SPIE Medical Imaging 2006: Image Processing, J. M. Reinhardt and J. P. W. Pluim, eds., 6144, pp. 373-388, March 2006.
16. M. W. Graham and W. E. Higgins, "Optimal graph-theoretic approach to 3D anatomical tree matching," in IEEE Int. Symp. on Biomedical Imaging, pp. 109-112, 2006.
17. M. Kukuk, "An "optimal" k-needle placement strategy and its application to guiding transbronchial needle aspirations," Computer Aided Surgery 9(6), pp. 261-290, 2004.
18. J. D. Gibbs and W. E. Higgins, "3D path planning and extension for endoscopic guidance," in SPIE Medical Imaging 2007: Visualization and Image-Guided Procedures, K. R. Cleary and M. I. Miga, eds., vol. 6509, pp. 6509 I K-I-6509 I K-13, 2007.
19. N. C. Dalrymple, S. R. Prasad, M. W. Freckleton, and K. N. Chintapalli, "Introduction to the language of three-dimensional imaging with multidetector CT," Radiographics 25, pp. 1409-1428, September-October 2005.
20. W. Kalender, Computed Tomography: Fundamentals, System Technology, Image Quality, Applications, Publicis MCD Verlag, Munich, 2000.
21. K. D. Hopper, A. T. Iyriboz, S. W. Wise, J. D. Neuman, D. T. Mauger, and C. J. Kasales, "Mucosal detail at CT virtual reality: surface versus volume rendering," Radiology 214, pp. 517-522, February 2000.
22. R. M. Summers, D. H. Feng, S. M. Holland, M. C. Sneller, and J. H. Shelhamer, "Virtual bronchoscopy: segmentation method for real-time display," Radiology 200, September 1996.
23. K. Mori, J. Hasegawa, J. Toriwaki, H. Anno, and K. Katada, "Recognition of bronchus in three dimensional X-Ray CT images with application to virtualized bronchoscopy system," Proc. 13th Int. Conf. Pattern Recognition III, pp. 528-532, August 1996.
24. A. P. Kiraly, W. E. Higgins, E. A. Hoffman, G. McLennan, and J. M. Reinhardt, "3D human airway segmentation methods for virtual bronchoscopy," Academic Radiology 9, pp. 1 153-1 168, October 2002.
25. D. Bilgen, "Segmentation and analysis of the human airway tree from 3D X-ray CT images," Master's thesis, The University of Iowa, 2000.
26. C. Fetita, F. Preteux, C. Beigelman-Aubry, and P. Grenier, "Pulmonary airways: 3-D reconstruction from multislice CT and clinical investigation," WEE Transactions on Medical Imaging 23, pp. 1353-1364, November 2004.
27. T. Schlathoelter, C. Lorenz, I. C. Carlsen, and S. Renisch, "Simultaneous segmentation and tree reconstruction of the airways for virtual bronchoscopy," in SPIE Medical Imaging 2002: Image Processing, M. Sonka and J. M. Fitzpatrick, eds., 4684, pp. 103-113, 2002.
28. D. Mayer, D. Bartz, J. Fischer, S. Ley, and A. del Rio, "Hybrid segmentation and virtual bronchoscopy based on CT images," Academic Radiology 11, pp. 551-565, May 2004.
29. F. Asano, J. Shindoh, K. Shigemitsu, K. Miya, T. Abe, M. Horiba, and Y. Ishihara, "Ultrathin bronchoscopic barium marking with virtual bronchoscopic navigation for fluoroscopy-assisted thoracoscopic surgery," Chest 126, pp. 1687-1693, November 2004.
30. F. Asano, Y. Matsuno, N. Shinagawa, K. Yamazaki, T. Suzuki, and H. Moriya, "A virtual bronchoscopic navigation system for pulmonary peripheral lesions," Chest 130, pp. 559-66, August 2006.
31. N. Shinagawa, K. Yamazaki, Y. Onodera, F. Asano, T. Ishida, H. Moriya, and M. Nishimura, "Virtual bronchoscopic navigation system shortens the examination time-feasibility study of virtual bronchoscopic navigation system," Lung Cancer 56(2), pp. 201-206, 2007.
32. M. W. Graham, J. D. Gibbs, K. C. Yu, D. C. Cornish, M. S. Khan, R. Bascom, and W. E. Higgins, "Image-guided bronchoscopy for peripheral nodule biopsy: A human feasibility study," in Proceedings of the American Thoracic Society, May 2008 {in submission).
33. A. X. Falc[a\tilde]o, J. K. Udupa, S. Samarasekera, and S. Sharma, "User-steered image segmentation paradigms: Live wire and live lane," Graphical Models and Image Processing 60, pp. 233-260, July 1998.
34. E. N. Mortensen and W. A. Barrett, "Interactive segmentation with intelligent scissors," Graphical Models and Image Processing 60(5), pp. 349-384, 1998.
35. K. Lu and W. E. Higgins, "Interactive segmentation based on the live wire for 3D CT chest image analysis," International Journal of Computer Assisted Radiology and Surgery 2, pp. 151-167, December 2007.
36. A. Saragaglia, C. Fetita, P. Y. Brillet, F. Preteux, and P. A. Grenier, "Airway wall thickness assessment: a new functionality in virtual bronchoscopy investigation," in SPIE Medical Imaging 2007: Physiology, Function, and Structure from Medical Images, A. Manduca and X. P. Hu, eds., vol. 651 1(1), pp. 651 10P-1-651 10P-12, 2007.
37. K. Li, X. Wu, D. Z. Chen, and M. Sonka, "Optimal surface segmentation in volumetric images—a graph-theoretic approach," IEEE Trans. Pan. Anal. Machine Intell. 28, pp. 119-134, January 2006.
38. T. Cormen, C. Leiserson, and R. Rivest, Introduction to Algorithms, MIT Press, Cambridge, 1990.
39. M. W. Graham, Robust Graph-Theoretic Methods for Matching and Labeling Anatomical Trees. PhD thesis, The Pennsylvania State University, 2008.
40. D. S. Johnson and K. A. Niemi, "On knapsacks, partitions, and a new dynamic programming technique for trees," Mathematics of Operations Research 8, pp. 1-14, February 1983.

41. I. Adler and D. C. Monteiro, "A geometric view of parametric linear programming," Algorithmica 8, pp. 161-176, January 1992.
42. K. G. Murty, Linear Programming, Wiley, New York, 1983.
43. D. J. Kruglinski, Inside Visual C++, Microsoft Press, Redmond, Wash., 1997.
44. J. R. S. Wright and B. Lipchak, OpenGL Superbible, Sams Publishing, Indianapolis, 2004.
45. J. P. Helferty and W. E. Higgins, "Technique for registering 3D virtual CT images to endoscopic video," in IEEE Int. Conf. Image Processing, II, pp. 893-896, Oct. 7-10, 2001.
46. R. C. Gonzalez and R. E. Woods, Digital Image Processing, Addison Wesley, Reading, Mass., 2nd. ed., 2002.
47. S. Boyd and L. Vandenberghe, Convex Optimization, Cambridge University Press, Cambridge, UK, 2004.
48. T. H. Cormen, C. E. Leiserson, R. L. Rivest, and C. Stein, Introduction to Algorithms, MIT Press, Cambridge, Mass., 2001.
49. F. Netter, Atlas of Human Anatomy, CD3 A-GEIGY Corporation, Summit, N.J., 1989.
50. K. C. Yu, J. D. Gibbs, M. W. Graham, R. Bascom, and W. E. Higgins, "Interactive graphical report enables off-line 3D endobronchial route planning prior to bronchoscopy," in Proceedings of the American Thoracic Society, May 2008 (in submission).
51. M. W. Graham, J. D. Gibbs, and W. E. Higgins, "A robust system for human airway tree segmentation," SPIE Medical Imaging 2008: Image Processing, J. P. W. Pluim and J. M. Reinhardt, eds. vol. 6914, 2008 (in press).

All patents, applications, and publications referenced above are hereby incorporated by reference in their entirety.

The invention includes any number of combination of method and devices, or aspects of such methods and devices where such combinations are possible. The disclosure and invention specifically include combination of features and steps of various embodiments as well as combinations of the various embodiments where possible.

The invention claimed is:

1. A method of automatically reconstructing a model of a branching tubular organ via a hybrid approach that defines endoluminal airway surfaces from a chest scan and segmentation data, the model being used to provide guidance to a user of an endoscope, the method comprising:
   receiving three-dimensional (3D) digital image data of a branching tubular organ and anatomy surrounding the branching tubular organ;
   automatically computing, on a processor, a conservative segmentation of the branching tubular organ from the digital image data;
   generating a collection of peripheral branches not identified in the conservative segmentation based on approximating cross sections of the peripheral branches shown in the digital image data as ellipses;
   adding or extending at least one of the peripheral branches identified in the generating step to the conservative segmentation;
   automatically constructing, on the processor, accurate endoluminal surfaces of the organ segmentation, including any of the peripheral branches that were added or extended to the conservative segmentation;
   producing a reconstructed graphical image as a comprehensive model of the branching tubular organ including the at least one of the peripheral branches that were added or extended by the adding step, wherein the at least one of the peripheral branches that were added or extended is capable of being manipulated; and
   displaying, on a display device, the comprehensive model containing the accurate luminal surfaces through the branching tubular organ including the added or extended peripheral branches.

2. The method of claim 1, wherein the step of automatically computing the segmentation of the organ comprises:
   computing an initial coarse segmentation of the organ using the digital image;
   identifying a set of candidate branch sections;
   combining groups of candidate branch sections into a set of disjoint candidate branch segments;
   linking nearby branch segments using connection functions; and
   calculating an optimal reconstruction of the organ using the coarse segmentation, the candidate branch segments, and the connection functions.

3. The method of claim 2, wherein the step of identifying a set of candidate peripheral branch segments includes the steps of:
   scanning the digital image for short branch sections; and
   connecting sections that share a common boundary.

4. The method of claim 3, wherein the step of connecting branch sections that share a common boundary includes the use of smooth interpolated surfaces.

5. The method of claim 2, wherein the step of identifying branch sections includes the use of a global graph partitioning algorithm.

6. The method of claim 1, wherein the 3D digital image is a computed-tomography image of the chest.

7. The method of claim 1, wherein the branching tubular organ is an airway tree.

8. The method of claim 1, wherein the branching tubular organ is a vascular system.

9. The method of claim 1, wherein the model enables guidance of endoscopy to a diagnostic ROI.

10. The method of claim 1, wherein the endoluminal surfaces are derived from a topological dilation of the organ segmentation.

11. The method of claim 1, wherein the endoluminal surfaces are computed from locally defined isosurfaces.

12. The method of claim 1, wherein the endoluminal surfaces are computed from a combination of deriving the endoluminal surfaces from a topological dilation of the organ segmentation and computing the endoluminal surfaces from locally defined isosurfaces.

13. The method of claim 10, wherein the topological dilation is determined by a linear programming algorithm and the linear programming algorithm satisfies topological and smoothness constraints.

14. A system for automatically reconstructing a model of a path through a branching tubular organ via a hybrid approach that defines endoluminal airway surfaces from a chest scan and segmentation data, the model being used to provide guidance to a user of an endoscope, the system comprising:
   a processor having an input for receiving a 3D digital image of surrounding anatomy, the processor performing all the following functions:
      automatically computing a conservative segmentation of the branching tubular organ using the digital image;
      generating a collection of peripheral branches not identified in the conservative segmentation based on approximating cross sections of the peripheral branches shown in the digital image data as ellipses;

receiving an instruction to add or extend at least one of the peripheral branches to the conservative organ segmentation;

constructing accurate endoluminal surfaces of the organ's branches including any peripheral branches that were added or extended to the conservative segmentation;

producing a reconstructed graphical image as a comprehensive model of the branching tubular organ including the at least one of the peripheral branches that were added or extended, wherein the at least one of the peripheral branches that were added or extended is capable of being manipulated; and directing a display device to display the comprehensive model containing the accurate luminal surfaces through the branching tubular organ including the added or extended peripheral branches.

15. The system of claim 14, wherein the automatic segmentation includes:

computing an initial coarse segmentation of the organ using the digital image;

identifying a set of candidate branch sections;

combining groups of candidate branch sections into a set of disjoint candidate branch segments;

linking nearby branch segments using connection functions; and calculating an optimal reconstruction of the organ using the coarse segmentation, the candidate branch segments, and the connection functions.

16. The system of claim 14, including an input for adding new candidate branches to the organ.

17. The system of claim 14, wherein the processor is operative to identify a set of candidate branch segments, including:

scanning the digital image for short branch sections; and connecting sections that share a common boundary.

18. The system of claim 17, wherein the processor is operative to connect branch sections that share a common boundary using smooth interpolated surfaces.

19. The system of claim 17, wherein the processor is operative to determine valid branches among the candidates using a global graph partitioning algorithm.

20. The system of claim 14, wherein the 3D digital image is a computed-tomography image of the chest.

21. The system of claim 14, wherein the branching tubular organ is an airway tree.

22. The system of claim 14, wherein the branching tubular organ is a vascular system.

23. The system of claim 14, wherein the model of the path enables guidance of endoscopy to a diagnostic ROI.

24. The system of claim 14, wherein the processor is operative to determine endoluminal surfaces from a topological dilation of the organ segmentation.

25. The system of claim 14, wherein the endoluminal surfaces are computed from locally defined isosurfaces.

26. The system of claim 14, wherein the endoluminal surfaces are computed from a combination of deriving the endoluminal surfaces from a topological dilation of the organ segmentation and computing the endoluminal surfaces from locally defined isosurfaces.

27. The system of claim 24, wherein the topological dilation is determined by a linear programming algorithm and the linear programming algorithm satisfies topological and smoothness constraints.

28. The method of claim 1 wherein global information in the image is used to construct the model.

29. The method of claim 1 wherein said connection functions are smooth interpolated parametric connection functions.

30. The method of claim 1 further comprising removing sections from the organ model.

31. A method of automatically reconstructing a model of a branching tubular organ via a hybrid approach that defines endoluminal airway surfaces from a chest scan and segmentation data, the model being used to provide guidance to a user of an endoscope, the method comprising:

receiving three-dimensional (3D) digital image data of a branching tubular organ and anatomy surrounding the branching tubular organ;

automatically computing, on a processor, a conservative segmentation of the branching tubular organ from the digital image data;

generating a collection of peripheral branches not identified in the conservative segmentation based on approximating cross sections of the peripheral branches shown in the digital image data as ellipses;

adding or extending at least one of the peripheral branches identified in the generating step to the conservative segmentation;

automatically constructing, on the processor, accurate endoluminal surfaces of the organ segmentation, including any of the peripheral branches that were added or extended to the conservative segmentation;

producing a comprehensive model of the branching tubular organ including the at least one of the peripheral branches that were added or extended by the adding step, wherein the comprehensive model is a reconstructed graphical image that provides increased visual quality in depicting the branching tubular organ relative to the 3D digital image data; and displaying, on a display device, the comprehensive model containing the accurate luminal surfaces through the branching tubular organ including the added or extended peripheral branches.

* * * * *